(12) United States Patent
Kimura et al.

(10) Patent No.: US 8,311,001 B2
(45) Date of Patent: Nov. 13, 2012

(54) RADIO RESOURCE ALLOCATION CONTROL APPARATUS AND METHOD AND BASE STATION

(75) Inventors: Dai Kimura, Kawasaki (JP); Tsuyoshi Shimomura, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 12/393,308

(22) Filed: Feb. 26, 2009

(65) Prior Publication Data

US 2009/0219876 A1 Sep. 3, 2009

(30) Foreign Application Priority Data

Feb. 28, 2008 (JP) .................................. 2008-48216

(51) Int. Cl.
*H04W 4/00* (2009.01)
*H04W 72/00* (2009.01)

(52) U.S. Cl. ...................... 370/329; 455/451
(58) Field of Classification Search .................. None
See application file for complete search history.

(56) References Cited

U.S. PATENT DOCUMENTS

| | | | | |
|---|---|---|---|---|
| 7,653,025 | B1 * | 1/2010 | Kim et al. | 370/329 |
| 7,773,685 | B2 * | 8/2010 | Tirkkonen et al. | 375/267 |
| 2003/0142658 | A1 | 7/2003 | Ofuji et al. | |
| 2005/0105629 | A1 * | 5/2005 | Hottinen et al. | 375/261 |
| 2005/0129063 | A1 * | 6/2005 | Razoumov et al. | 370/468 |
| 2005/0163111 | A1 | 7/2005 | Ishii et al. | |
| 2005/0259661 | A1 | 11/2005 | Ishii et al. | |
| 2006/0146721 | A1 * | 7/2006 | Attar et al. | 370/238 |
| 2007/0070908 | A1 * | 3/2007 | Ghosh et al. | 370/236 |
| 2008/0014976 | A1 | 1/2008 | Fujita et al. | |
| 2008/0176577 | A1 * | 7/2008 | Bourlas et al. | 455/454 |
| 2009/0016275 | A1 * | 1/2009 | Liu et al. | 370/329 |
| 2009/0219912 | A1 * | 9/2009 | Wengerter et al. | 370/345 |
| 2010/0189080 | A1 * | 7/2010 | Hu et al. | 370/335 |
| 2010/0278152 | A1 * | 11/2010 | Andreozzi et al. | 370/335 |

FOREIGN PATENT DOCUMENTS

| | | |
|---|---|---|
| EP | 1793639 | 6/2007 |
| EP | 1879422 | 1/2008 |
| EP | 1892972 | 2/2008 |
| JP | 2003-018647 | 1/2003 |

(Continued)

OTHER PUBLICATIONS

Nortel; 3GPP TSG-RAN WG1#49bis R1-072774; "UL MU-MIMO Performance Improvement for E-UTRA"; Orlando, Florida, USA, Jun. 25-29, 2007.

A. Jalali et al; "Data Throughput of CDMA-HDR a High Efficiency-High Data Rate Personal Communication Wireless System"; Proceeding of IEEE VTC-2000 Spring.

(Continued)

*Primary Examiner* — Hassan Phillips
*Assistant Examiner* — Eunsook Choi
(74) *Attorney, Agent, or Firm* — Myers Wolin, LLC

(57) ABSTRACT

A radio resource allocation control apparatus for controlling allocation of radio resources used in communication by a plurality of user equipment in a wireless communication system, the apparatus including a selecting unit for selecting a user equipment to which the allocation is performed by using a priority evaluation formula in which a plurality of user equipment having wireless communication characteristics that have a higher tendency of being selected as a target of the allocation vary when different coefficients are imparted. The apparatus includes a control unit for controlling the coefficients individually for the radio resources.

18 Claims, 15 Drawing Sheets

FOREIGN PATENT DOCUMENTS

| | | |
|---|---|---|
| JP | 2003-152630 | 5/2003 |
| JP | 2003-229894 | 8/2003 |
| JP | 2004-312190 | 11/2004 |
| JP | 2005-117579 | 4/2005 |
| JP | 2005-191745 | 7/2005 |
| JP | 2005-236918 | 9/2005 |
| JP | 2008-22135 | 1/2008 |
| WO | 2007079058 | 7/2007 |

OTHER PUBLICATIONS

The extended European search report includes European search opinion, issued for corresponding European Patent Application No. 09153763.9 dated Nov. 21, 2011.

Notification of Reason for Refusal issued for corresponding Japanese Patent Application No. 2008-048216 dispatched on May 8, 2012 with English translation.

\* cited by examiner

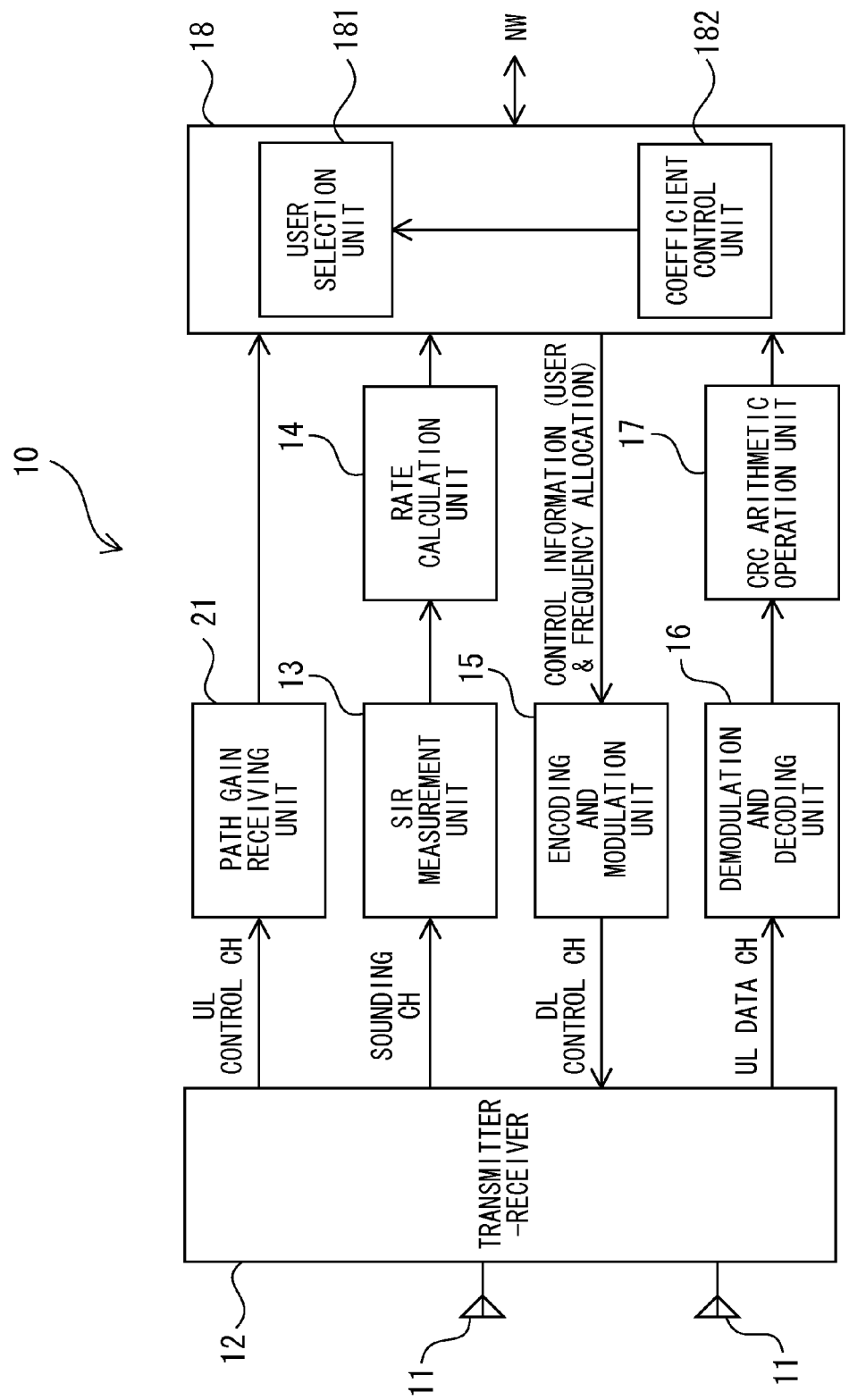

RADIO RESOURCE ALLOCATION CONTROL APPARATUS AND METHOD AND BASE STATION

CROSS-REFERENCE TO RELATED APPLICATION(S)

This application is based upon and claims the benefit of priority of the prior Japanese Patent Application No. 2008-48216, filed February 28, 2008, the entire contents of which are incorporated herein by reference.

FIELD

The present invention relates to radio resource allocation control apparatus and method and a base station. The present invention can be applied, for example, to the control (scheduling) of transmission and receiving of data to and from a plurality of users (user equipment) in a wireless communication system.

BACKGROUND

In LTE (Long Term Evolution) of 3GPP (3rd Generation Partnership Project) which is discussed as a next generation mobile communication method, OFDM (Orthogonal Frequency Division Multiplexing) can be employed as a wireless access method of a down link (DL) in the direction from a base station (BS) to a user equipment (UE). As a wireless access method of an up link (UL) in the opposite direction, an SC-FDMA (Single Carrier-Frequency Division Multiple Access) method can be employed.

In these methods, communication can be performed in a manner that signals to a plurality of user equipment (simply referred to as "users" in some cases, hereinafter) or signals from a plurality of users are multiplexed into mutually different frequency bands at the same time (timing).

Further, such discussed methods include: a single user MIMO (Multi-Input Multi-Output) method in which independent signals transmitted from a plurality of antennas are received through a plurality of receiving antennas; and a multi-user MIMO method in which transmission and receiving are performed simultaneously between a plurality of antennas of a base station and a plurality of user equipment.

Here, with taking into consideration the throughput, the coverage, and the like, a scheduler in the base station can perform scheduling in a time domain, a frequency domain, or a space domain (between transmission antennas). That is, with recognizing the receiving condition and the like of users distributed in the radio area (cell) of a base station, the scheduler can allocate the radio resources (such as the frequency and the timing) to the users, and then instruct the user terminals through the control channel to perform transmission operation of UL data and receiving operation of DL data.

Algorithms used in scheduling include a Round Robin (RR) method, a Maximum Carrier-to-Interference power Ratio (MaxCIR) method, and a Proportional Fairness (PF) method.

In round robin scheduling, transmission and receiving opportunities are allocated to individual users sequentially (without setting up priority).

In the MaxCIR method, transmission and receiving opportunities are allocated with priority to users having the highest channel quality (receiving quality). The MaxCIR method is an algorithm preferable from the viewpoint of maximizing the throughput (system throughput) of the entire system. Nevertheless, a possibility is present that transmission and receiving opportunities are seldom allocated to users having poor receiving quality.

Thus, the PF method has been devised from the viewpoint of allocating transmission and receiving opportunities fairly to individual users and yet maximizing the system throughput. In the PF method, a value obtained by dividing the instantaneous rate (throughput) by the average rate (throughput) is adopted as the priority of each user terminal, and then transmission and receiving opportunities are allocated with priority to users having the maximum priority having been calculated.

An example of a calculation formula for the priority ($\rho k, l$) in the PF method is shown as the following Formula (1). Here, k is the index of a user, and l is the index of time (timing). Further, rk,l denotes the instantaneous receive ready rate of the user #k at the timing #l. This quantity is obtained on the basis of the SIR (Signal to Interference Ratio) and the performance of the receiver. Further, Rk denotes the average receive rate of the user #k, that is, the average rate that the user #k has actually succeeded in receiving.

$$\rho_{k,l} = \frac{r_{k,l}}{R_k} \qquad (1)$$

The above-mentioned PF method can be employed in frequency scheduling. That is, the SIR (or prediction throughput) of each user is calculated for each of a plurality of frequency bands (identified by an index i). Then, for each frequency band i, a priority ($\rho i, k, l$) is calculated on the basis of a PF method, for example, shown by the following Formula (2). Then, transmission and receiving opportunities are allocated to users having the highest priority.

$$\rho_{i,k,l} = \frac{r_{i,k,l}}{R_k} \qquad (2)$$

By using an arbitrary weight coefficient α, this Formula (2) can be generalized as shown by the following Formula (3).

$$\rho_{i,k,l} = \frac{r_{i,k,l}}{R_k^\alpha} \qquad (3)$$

Here, when α=0, the scheduling corresponds to a MaxCIR method. When α=1, the scheduling corresponds to a PF method. When α→~, the scheduling becomes such that the average throughputs of the individual users are equalized (a higher priority is imparted to a user having a lower average throughput).

The following description is given for the scheduling of the UL. However, similar discussion holds for the scheduling of the DL.

Transmitted radio waves of a user (referred to as a cell edge user, hereinafter) located on the boundary of a cell (or sector) or its vicinity (referred to as a cell edge, hereinafter) interfere with those of cell edge users of adjacent cells in some cases. Thus, when transmission opportunities are allocated simultaneously to cell edge users of individual adjacent cells, the cell edge throughputs decrease substantially in some cases.

Thus, in order to avoid this situation and improve the cell coverage, an approach is proposed that bands for cell edge users and bands for users (cell center users) located near a base station are set up concerning the frequency bands, and that the band setting is changed (made different) between adjacent cells.

For example, a threshold value is set up concerning the receiving SIR of the individual users. Users having a receiving SIR value higher than the threshold value are defined as cell center users, while users having a receiving SIR value lower than the threshold value are defined as cell edge users. Then, the system frequency band is divided scheduling units (these divided bands are referred to as subbands), and then correspondence is established between the subbands and the user classes. That is, particular subbands are dedicated to cell center users, while other particular subbands are dedicated to cell edge users.

This correspondence is shifted (made different) for individual subbands such that cell edge users in adjacent cells (or sectors) may not obtain transmission opportunities simultaneously in the same subband. This improves the throughputs of cell edge users.

On the other hand, in the UL multiuser MIMO method, in an UL, MIMO receiving is performed in a state that a plurality of users are assigned to the same time and the same frequency, so that the throughput is improved. The outline of the multiuser MIMO method is described below. The following description is given for a case that the number of transmission antennas of each user is 1. When N user numbers (indices) selected by a scheduler are denoted by k(1), k(2), ..., k(N), the received signal yk is expressed as shown by the following Formula (4).

$$y_k = \sum_{i=1}^{N} h_{k(i)} x_{k(i)} + n = H_k x_k + n \quad (4)$$

where xk(i) denotes a transmission signal vector from a user k(i) (i=1 to N), hk(i) denotes a channel estimate vector with respect to a user k(i), H denotes a channel matrix, and n denotes a noise vector.

When the number of users per cell (sector) is denoted by Nuser, the number of candidates of selection in scheduling is $${}_{Nuser}C_N$$

For example, when N=2, the number of candidates of selection is Nuser(Nuser−1)/2.

Further, in order to improve the throughput of the multiuser MIMO method, an MMSE-SIC (Minimum Mean Square Error-Successive Interference Cancel) method is discussed. In the MMSE-SIC method, a plurality of transmission streams are equalized and decoded sequentially by using an MMSE weight. Then, when a CRC (Cyclic Redundancy Check) result is OK, a replica signal is generated on the basis a re-encoded transmission symbol sequence and a channel estimate value, and then this replica signal component is cancelled from the received signal. The sequence of the above-mentioned equalization and decoding in the MMSE-SIC is referred to as a "layer".

In the UL multiuser MIMO method, when a plurality of cell edge users are multiplexed into the same subband at the same timing, this can cause an increase of interference between the cells, and hence can cause degradation in the throughput. In order to avoid this situation, an approach is proposed that cell edge users and cell center users are distinguished as described above and then assigned to appropriate layers so that the throughput is improved.

There are four documents pertinent to the related art, Japanese Laid-Open Patent Publication No. 2005-236918, Japanese Laid-Open Patent Publication No. 2005-191745, A. Jarali, R. Padovani, R. Pankaj, "Data Throughput of CDMA-HDR a High Efficiency-High Data Rate Personal Communication Wireless System," Proceeding of IEEE VTC-2000 Spring, and Nortel, 3GPP TSG-RAN WG1#49bis R1-072774 ("UL MU-MIMO Performance Improvement for E-UTRA"), Orlando, Fla. USA, Jun. 25-29, 2007.

Nevertheless, the above-mentioned method that cell edge users and cell center users are distinguished (grouped) on the basis of a threshold value causes fixation of the subbands or layers to which the users of individual groups are to be assigned. This prevents flexible processing for such cases that the distribution of users varies within the cells or sectors, and hence can cause inefficient allocation such as exhaustion of particular radio resources.

SUMMARY

According to an aspect of the embodiments, a radio resource allocation control apparatus for controlling allocation of radio resources used in communication by a plurality of user equipment in a wireless communication system, the apparatus including a selecting unit for selecting a user equipment to which the allocation is performed by using a priority evaluation formula in which user equipment having wireless communication characteristics that have a higher tendency of being selected as a target of the allocation vary when different coefficients are imparted. The apparatus includes a control unit for controlling the coefficients individually for the radio resources.

The object and advantages of the embodiments will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF THE DRAWINGS

FIG. 15 is a block diagram illustrating an exemplary configuration of a BS in a case that scheduling is performed taking into consideration gains in adjacent cells (or sectors).

DESCRIPTION OF EMBODIMENTS

Figure 1:
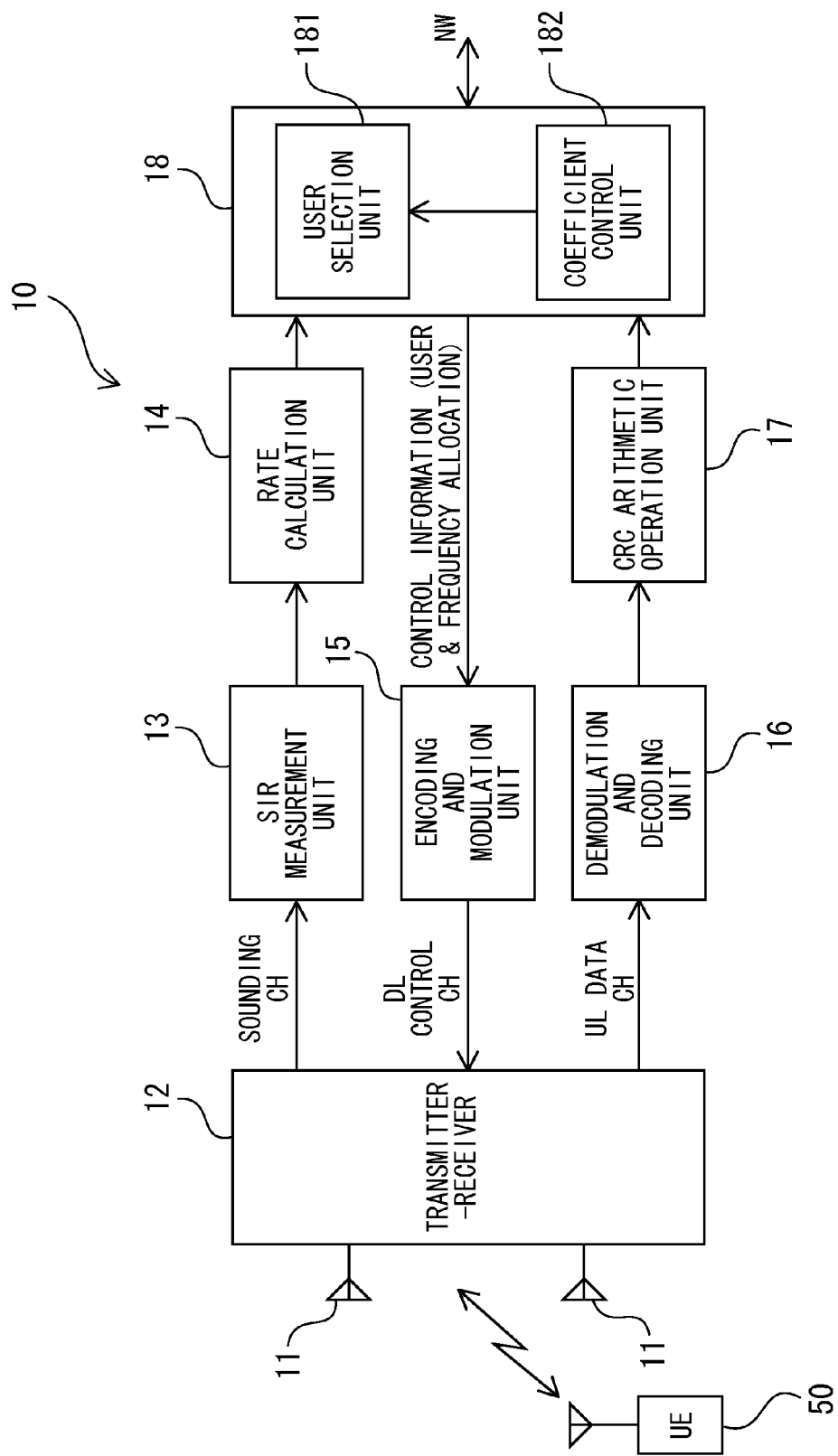
FIG. 1 is a block diagram illustrating an exemplary configuration of a BS in a wireless communication system according to an embodiment.

Certain embodiments are described below with reference to the drawings. Embodiments described below are illustrative and do not eliminate the application of various kinds of modifications and techniques not specified below. That is, the present embodiments may be implemented in a variously modified manner (e.g., embodiments are combined) within a range that does not deviate from the spirit of the present invention.

[A] Outline

In comparison with the related art described above, certain embodiments herein provide a scheduling method in which, in a state that the advantage in the PF method concerning frequency scheduling and space scheduling is maintained, a smaller number of parameters are employed and situation changes can be treated flexibly.

In one exemplary embodiment where scheduling is to be performed in the time domain, the frequency domain, and the space domain (layer) (time/frequency/space scheduling), k is the index of a user (user equipment), l is the index of time (timing), i is the index of a frequency band (subband), and j is the index of a layer. Then, the priority (scheduling parameter) $\rho_{i,j,k,l}$ of the user #k is calculated according to a priority evaluation formula expressed by the following Formula (8).

$$\rho_{i,j,k,l} = \frac{r_{i,j,k,l}}{R_{k,l}^{\alpha_{i,j}}} \tag{8}$$

Here, $r_{i,j,k,l}$ denotes the instantaneous throughput of a user #k at a timing #l in a frequency band (subband) #i and a layer #j. $R_{k,l}$ denotes the average throughput of a user #k up to a timing #l, and indicates the average rate that the user #k has actually succeeded in receiving. Symbol $\alpha_{i,j}$ denotes a weight coefficient that can be set into a value different depending on the frequency band #i and the layer #j. When $\alpha_{i,j}=0$, the scheduling corresponds to a MaxCIR method. When $\alpha_{i,j}=1$, the scheduling corresponds to a PF method. When $\alpha_{i,j} \to \infty$, the scheduling becomes such that the average throughputs of the individual users #k are equalized (a higher priority is imparted to a user having a lower average throughput).

The instantaneous throughput and the average throughput described above may be those of the receiving throughput of the DL of a user (user equipments) #k, or alternatively those of the transmission throughput of the UL. In each case, an instantaneous receiving (transmission) throughput and an average receiving (transmission) throughput may be used that are measured by the user #k and then notified as control signals of the UL to the base station. Further, the base station measures the instantaneous transmission (receive) ready throughput and the average transmission (receiving) throughput of the transmission (receiving) data of the DL (UL). Then, the measurement results may be adopted as approximated values of the instantaneous receive (transmission) ready throughput and the average receiving (transmission) throughput of the user #k (a similar situation holds in the following).

Here, in the following description, a parameter expressed by using a subscript like Xy is expressed by using parentheses like X(y) in some cases. Further, the subscript part is omitted in some cases so that the symbol is expressed like X. For example, the priority $\rho_{i,j,k,l}$ is expressed as $\rho(i,j,k,l)$ or simply $\rho$ in some cases. The weight coefficient $\alpha_{i,j}$ is expressed as $\alpha(i,j)$ or simply $\alpha$ in some cases.

The scheduler of the present embodiment allocates transmission and/or receiver opportunities starting at a user #k having the highest value of the priority $\rho$ obtained by Formula (8) serving as an example of a priority evaluation formula. Here, the form of a formula is not limited to Formula (8). The formula may be generalized into a function $f(R_{k,l}, \alpha_{i,j}, r_{i,j,k,l})$ of $R_{k,l}$, $\alpha_{i,j}$, and $r_{i,j,k,l}$.

Further, when scheduling is to be performed in the time domain and the frequency domain (time/frequency scheduling), the following Formula (9) may be employed as the priority evaluation formula.

$$\rho_{i,k,l} = \frac{r_{i,k,l}}{R_{k,l}^{\alpha_i}} \tag{9}$$

Further, when scheduling is to be performed in the time domain and the space domain (layer) (time/space scheduling), the following Formula (10) may be employed as the priority evaluation formula.

$$\rho_{j,k,l} = \frac{r_{j,k,l}}{R_{k,l}^{\alpha_j}} \tag{10}$$

As such, when the weight coefficient $\alpha$ is varied for each frequency or layer, a user having a higher tendency of being selected can be varied in each frequency and each layer. Further, when set up is performed such that the same weight coefficient $\alpha$ is not used for the same frequency or the same layer in adjacent cells, an effect larger than that of the related art is expected.

Even when the distribution (ratio) of cell edge users and cell center users varies substantially, the change can be treated flexibly. That is, according to the present example, the cell throughput and the cell coverage can be improved in comparison with the related art. Further, a scheduling algorithm is provided that can treat a large change in the situation. In the related art, correspondence between the weight coefficient $\alpha$ and the frequency (band) or the layer of MIMO is not established.

The above-mentioned Formulas (8) to (10) are all based on the evaluation formula employed in the PF method. However, these formulas are merely examples, and hence a formula based on another evaluation formula may be employed. That is, it is sufficient that a priority evaluation formula is employed in which user equipments having wireless communication characteristics that have a higher tendency of being selected as a target of allocation of radio resources (such as the frequency, the timing, and the layer) vary when different coefficients are imparted concerning wireless communication characteristics between the base station and the user equipments.

[B] Embodiments

The following description is given as an example of scheduling of an UL in LTE. The scheduling in the present example may be applied to the scheduling of an UL and DL in another system.

(B1) Time/Frequency Scheduling in SIMO (Single-Input Multi-Output)

Figure 2:
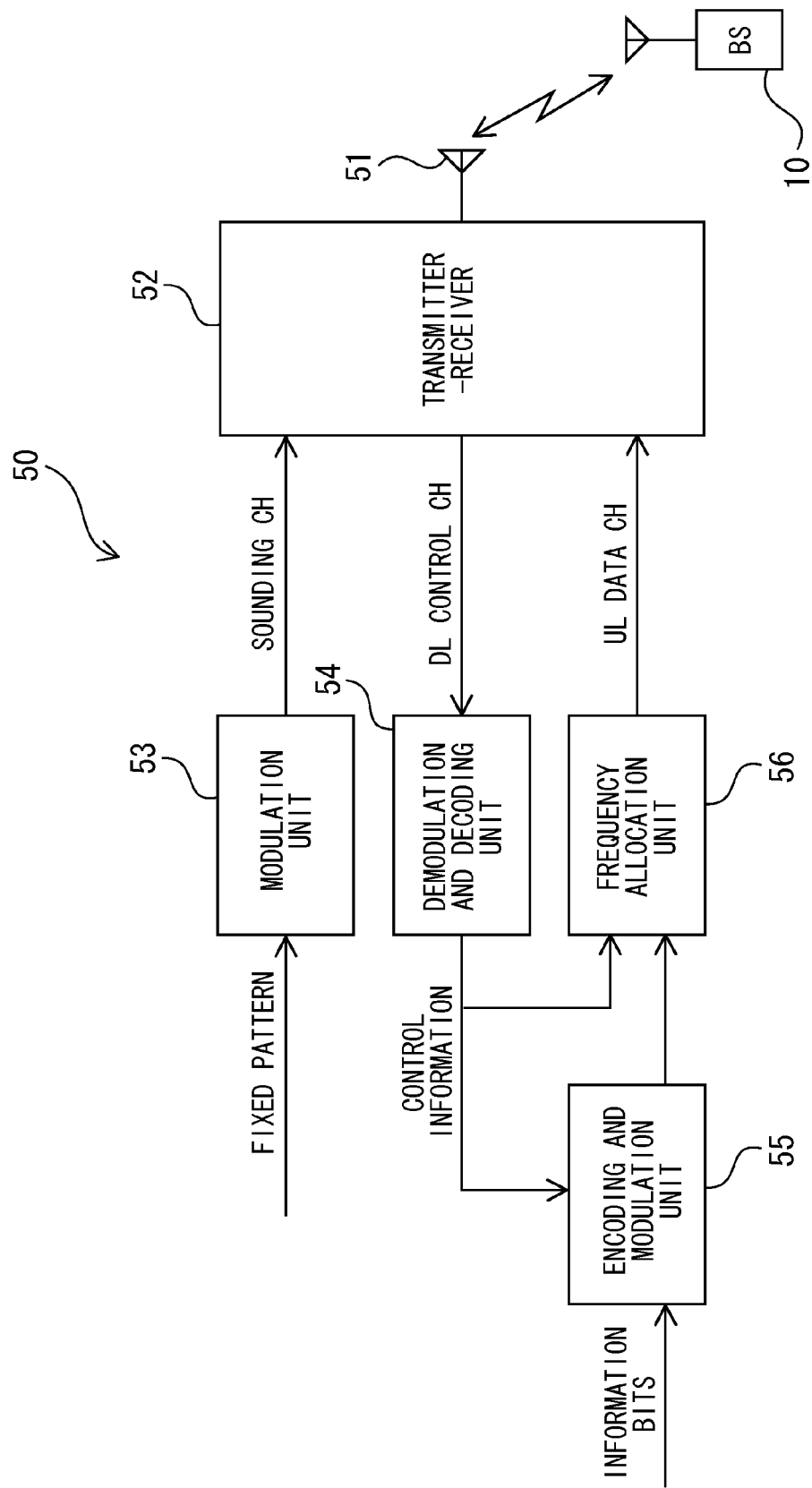
FIG. 2 is a block diagram illustrating an exemplary configuration of an UE that communicates with a BS illustrated in FIG. 1.

FIG. 1 is a block diagram illustrating an exemplary configuration of a Base Station (BS) in a wireless communication system according to an embodiment. FIG. 2 is a block diagram illustrating an exemplary configuration of a User Equipment (UE) that communicates with a BS through a radio link.

(BS)

The BS 10 illustrated in FIG. 1 has, for example, one or a plurality of antennas 11, a transmitter-receiver 12, an SIR measurement unit 13, a rate calculation unit 14, an encoding and modulation unit 15, a demodulation and decoding unit 16, a CRC arithmetic operation unit 17, and a scheduler 18.

The antenna 11 is a radio interface for transmitting and receiving a radio signal through a radio link between a UE 50 located in the radio area (cell or sector) formed by the base station 10. The radio link includes a UL and a DL, and may include a control channel and a data channel. Further, the UL may include a sounding channel (pilot channel) used by the UE 50 for periodically transmitting a reference signal sequence such as a pilot signal to the BS 10.

The transmitter-receiver 12 performs receiving processing such as low noise amplification, frequency conversion into a baseband frequency (down conversion), AD conversion, and channel separation, of an UL radio signal received through the antenna 11. On the other hand, the transmitter-receiver 12 performs transmission processing such as channel multiplexing, DA conversion, frequency conversion into a radio frequency (up conversion), and power amplification onto a DL transmission signal (including signals of a control channel and a data channel) directed to the UE 50.

The SIR measurement unit 13 performs SIR measurement for each subband on the basis of a signal of the sounding channel received and separated by the transmitter-receiver 12. On the basis of the SIR, an encode system and a modulation method to be used by the encoding and modulation unit 15 are determined for each subband. Examples of the encode system include error correcting encoding (FEC: Forward Error Correction) such as convolutional encoding, turbo encoding, and low density parity check (LDPC) encoding. Examples of the modulation method include multilevel quadrature modulation methods such as QPSK, 16QAM, and 64QAM.

When a modulation method and a coding rate are determined as described above, the number of transmission bits per packet data (simply referred to as a "packet" in some cases, hereinafter) is determined. Thus, on the basis of this, the rate calculation unit 14 can calculate the instantaneous transmission ready rate (throughput) $r_{i,k,l}$. Here, i is the index of a subband, k is the index of a user (UE 50), and l is the index of time (timing).

The scheduler 18 is an apparatus for controlling the allocation of radio resources (the frequency and the layer) to be used by a plurality of users #k in communication in the wireless communication system. On the basis of the received data (a signal of data channel) and the elapsed time measured from the transmission start of DL, the scheduler 18 calculates the average receive rate (throughput) $R_{k,l}$. The average receive rate (throughput) $R_{k,l}$ may be updated according to the following Formula (11).

$$R_{k,l} = \beta R_{k,l-1} + (1-\beta) r_{RX\,k,l} \qquad (11)$$

Here, β is a coefficient that can take an arbitrary value between 0 and 1, while r(RXk,l) denotes the receive rate of the preceding received packet. When no UL data has been transmitted from the user #k or alternatively when data has been transmitted but not received successfully, r(RXk,l)=0 is set up.

On the basis of these values, the scheduler 18 calculates the priority ρ(i,k,l) according to the priority evaluation formula expressed by the following Formula (12).

$$\rho_{i,k,l} = \frac{r_{i,k,l}}{R_{k,l}^{\alpha_i}} \qquad (12)$$

Here, αi is the weight coefficient for the average receive rate $R_{k,l}$, and can have a different value in each subband #i. With increasing αi value, the priority (selection probability) of a user (e.g., cell edge user) having a lower average throughput increases. On the contrary, with decreasing αi value, the priority of a user (e.g., cell center user) having a higher average throughput increases.

That is, as illustrated in FIG. 1, the scheduler 18 of the present embodiment has: the function of a user selection unit (selecting unit) 181 for selecting a user #k to which allocation is performed by using the priority evaluation formula (12) in which a user #k having wireless communication characteristics that have a higher tendency of being selected as a target of allocation of the frequency (subband #i) serving as an example of radio resources varies when different coefficients α are imparted concerning wireless communication characteristics with said user #k; and the function of the coefficient control unit (control unit) 182 for controlling the coefficient α for each radio resource (subband #i).

Thus, when the coefficient α is varied, users who have a higher tendency of being selected are changed in each frequency (subband). This avoids having particular users fixed to particular radio resources (subbands), and hence permits efficient and flexible allocation of radio resources.

When different patterns of the weight coefficient αi to the subband #i are set up for adjacent cells (or sectors) (e.g., the subband in which the same weight coefficient αi is set up is varied between adjacent cells (or sectors)), the probability is reduced that transmission opportunities in the same subband are simultaneously allocated to cell edge users in adjacent cells (or sectors). This helps to suppresses interference between adjacent cells (or sectors).

Figure 3:
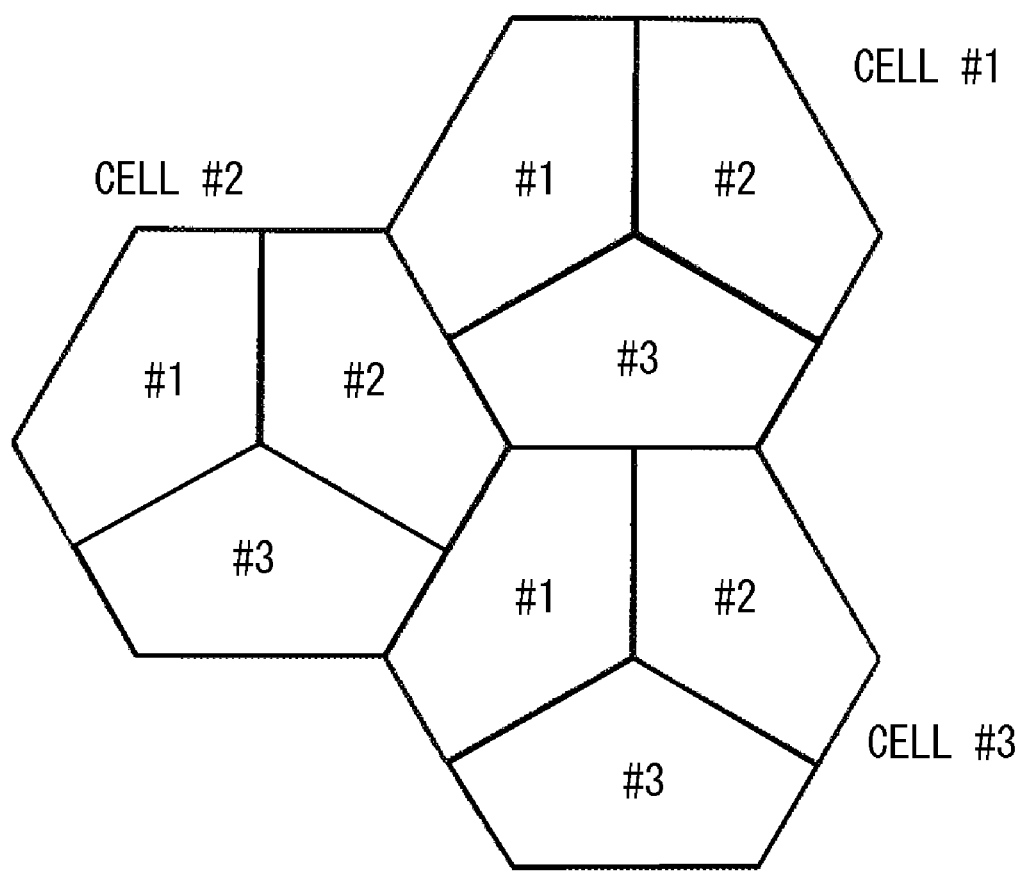
FIG. 3 is a diagram illustrating an example of cell (sector) arrangement according to an embodiment.
Figure 5:
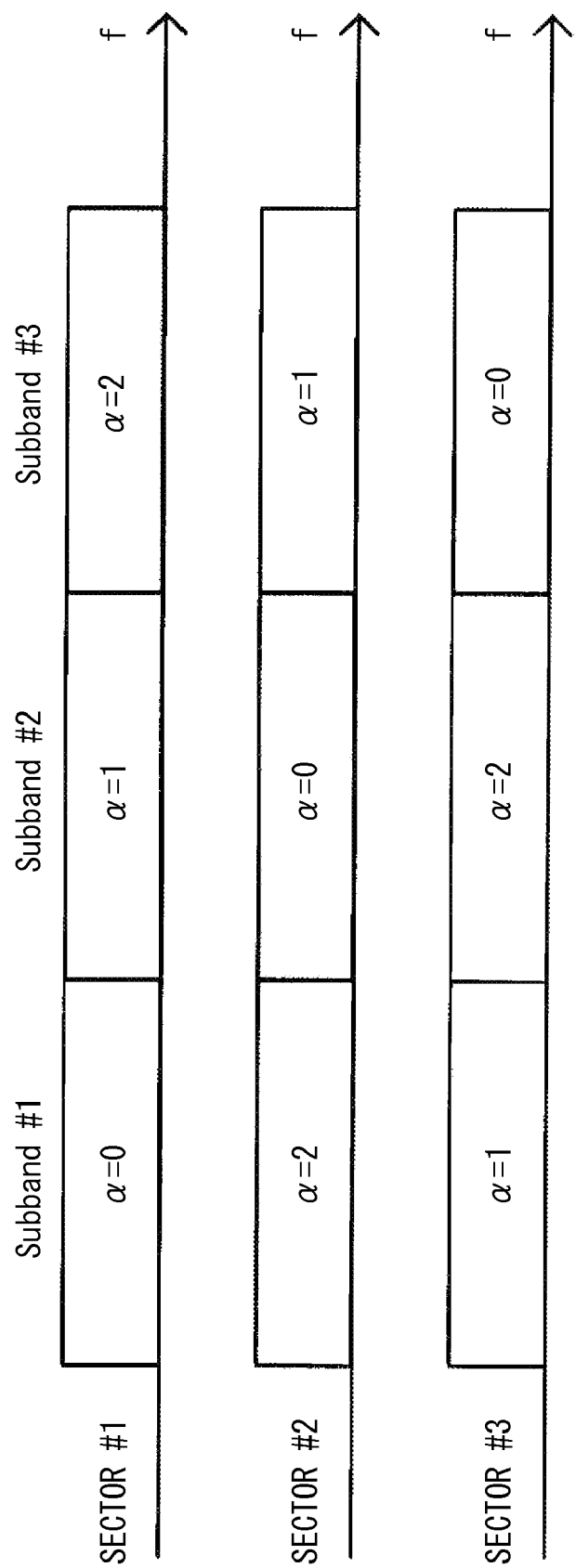
FIG. 5 is a diagram illustrating an example of weight coefficient setting in individual sectors in an arrangement illustrated in FIG. 3.

For example, in the cell (three sectors) arrangement illustrated in FIG. 3, the setting of the weight coefficient α as illustrated in FIG. 5 is possible. That is, in sector #1, α1=0 for the subband #1 (i.e., a MaxCIR method), α2=1 for the subband #2, and α3=2 for the subband #3. In the adjacent sector #2, α1=2 for the subband #1, α2=0 for the subband #2, and α3=1 for the subband #3. In the adjacent sector #3, α1=1 for the subband #1, α2=2 for the subband #2, and α3=0 for the subband #3.

Figure 4:
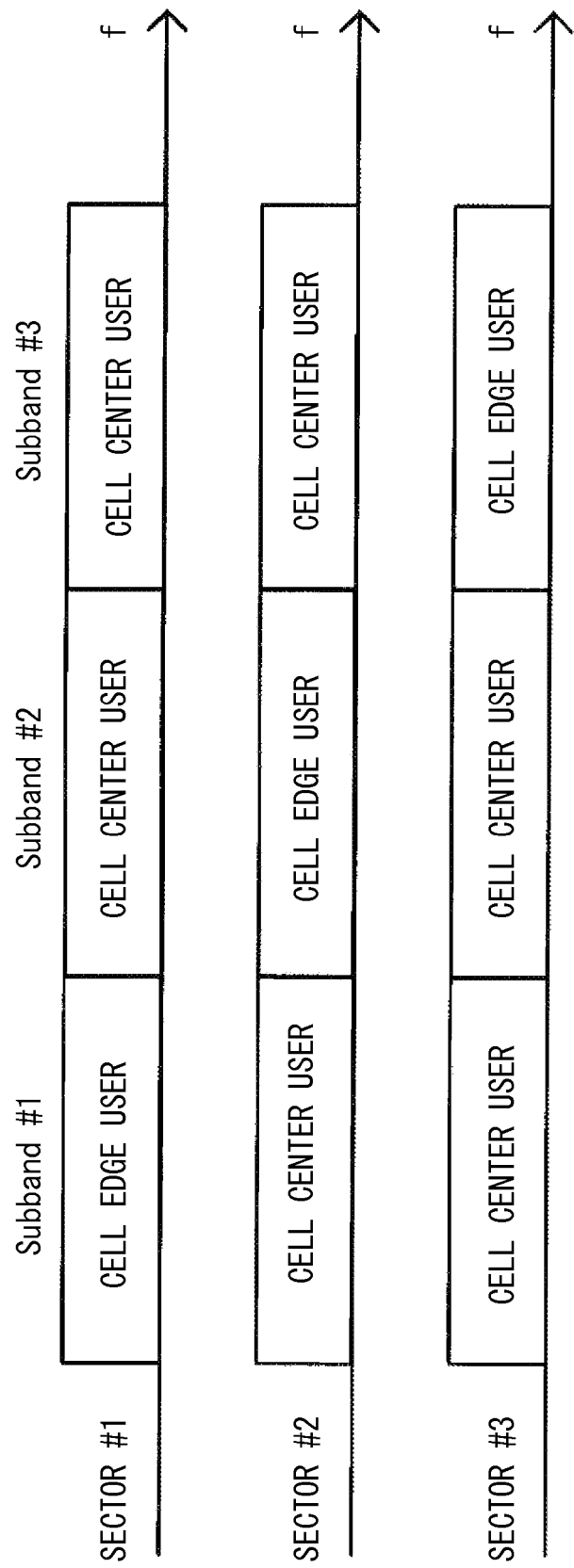
FIG. 4 is a diagram illustrating an example of user assignment in individual sectors in an arrangement illustrated in FIG. 3, in which an embodiment is described in comparison with a related art.

For reference, for the purpose of comparison, an example of correspondence of cell edge users and cell center users with the subbands described above as a related art is illustrated in FIG. 4. That is, different subbands are assigned to cell edge users (or cell center users) in each sector.

The scheduler 18 of the present embodiment selects a user having the maximum value of the priority ρ obtained by the above-mentioned Formula (12) as a target user to whom a transmission opportunity (radio resources) is to be allocated, and generates allocation information (control information) concerning a transmission opportunity directed to the user.

The encoding and modulation unit 15 encodes and modulates the control information according to the encode system and the modulation method determined on the basis of the measurement result of the SIR described above. Then, the generated modulated signal is transmitted as a signal of the control channel to the target user (UE 50) via the transmitter-receiver 12 and the antenna 11.

The demodulation and decoding unit 16 demodulates and decodes the signal of the UL data channel received and separated by the transmitter-receiver 12, according to a decode system and a demodulation method corresponding to the encode system and the modulation method employed in the transmitting source (UE 50).

The CRC arithmetic operation unit 17 performs CRC arithmetic operation on the decoded data obtained by the demodulation and decoding unit 16, and then notifies the arithmetic operation result (OK or NG) to the scheduler 18 for the purpose of calculation of the above-mentioned average receive rate Rk,l.

(UE)

The UE 50 illustrated in FIG. 2 has, for example, an antenna 51, a transmitter-receiver 52, a modulation unit 53, a demodulation and decoding unit 54, an encoding and modulation unit 55, and a frequency allocation unit 56.

The antenna 51 is a radio interface for transmitting and receiving a radio signal to and from the BS 10 through the radio link.

The transmitter-receiver 52 performs receiving processing such as low noise amplification, frequency conversion into a baseband frequency (down conversion), AD conversion, and channel separation, on a DL radio signal (including a signal of control channel) received through the antenna 51. On the other hand, the transmitter-receiver 52 performs transmission processing such as channel multiplexing, DA conversion, frequency conversion into a radio frequency (up conversion), and power amplification on a UL transmission signal (including signals of a sounding channel and a data channel) directed to the BS 10.

The modulation unit 53 modulates a reference signal sequence (e.g., a signal sequence having a fixed pattern) such as a pilot signal. Examples of the modulation method include multilevel quadrature modulation methods such as QPSK, 16QAM, and 64QAM.

The demodulation and decoding unit 54 demodulates and decodes the control channel signal received and separated by the transmitter-receiver 52, according to a decode system and a demodulation method corresponding to the encode system and the modulation method employed in the BS 10.

The encoding and modulation unit 55 encodes and modulates the UL transmission data (information bits) directed to the BS 10 according to the encode system and the modulation method specified by the BS 10 by using the control information decoded by the demodulation and decoding unit 54. Similarly to the BS 10 side, the employed encode system may be, for example, error correcting encoding (FEC) such as convolutional encoding, turbo encoding, and LDPC encoding. Further, similarly to the BS 10 side, the employed modulation method may be a multilevel quadrature modulation method such as QPSK, 16QAM, and 64QAM.

The frequency allocation unit 56 assigns the modulated signal obtained by the encoding and modulation unit 55 to a transmission frequency (data channel) specified by the BS 10 by using the control information decoded by the demodulation and decoding unit 54. The data channel signal is transmitted to the BS 10 via the transmitter-receiver 52.

Figure 6:
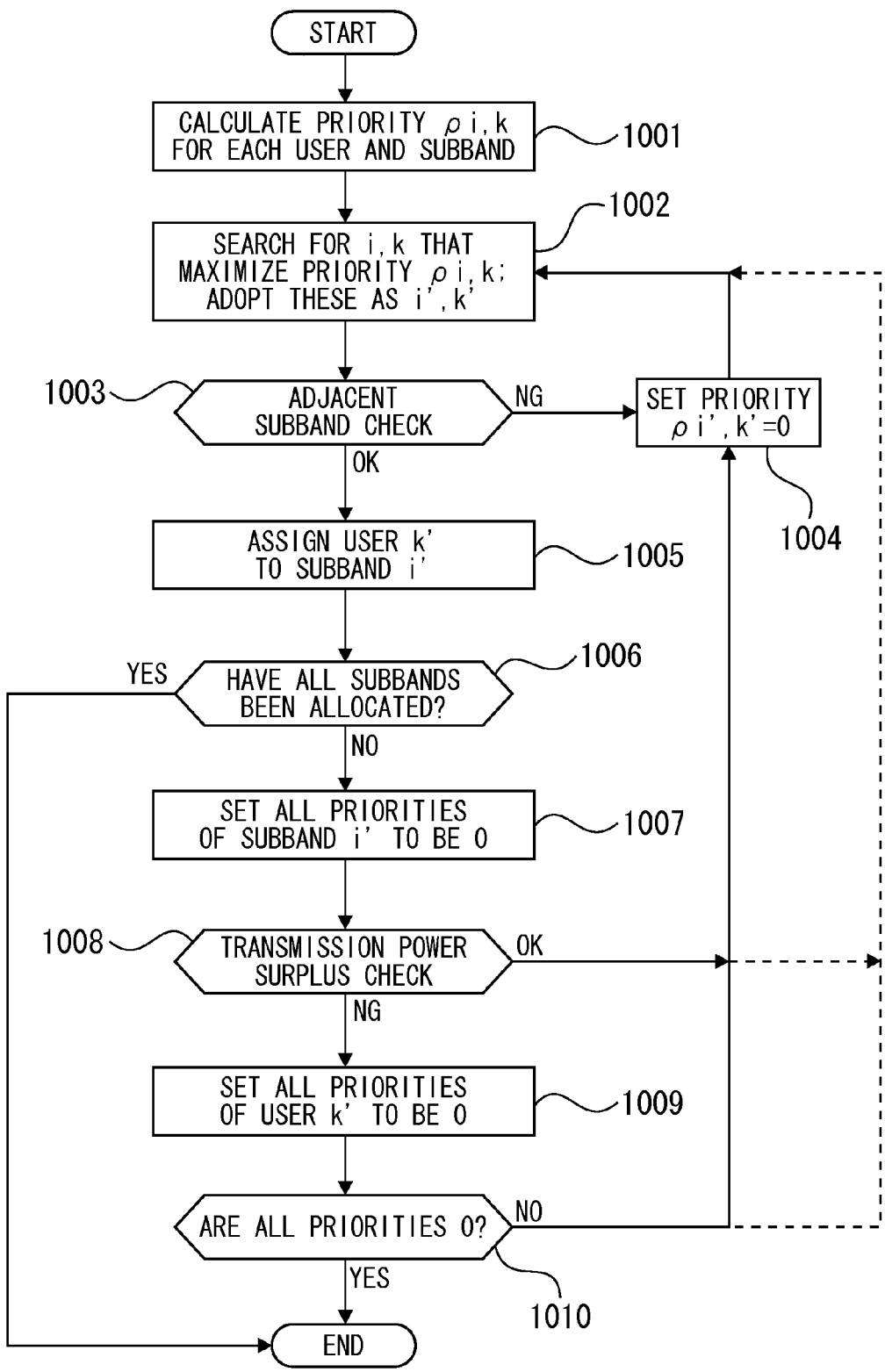
FIG. 6 is a flow chart describing an example of time/frequency scheduling performed by a scheduler of a BS illustrated in FIG. 1.

Next, frequency scheduling with respect to the UE 50 performed by above-mentioned BS 10 (scheduler 18) is described below with reference to a flow chart illustrated in FIG. 6. The flow chart illustrated in FIG. 6 is executed repeatedly with a predetermined scheduling period.

At a timing #l in a particular scheduling cycle, the scheduler 18 calculates a priority ρ(i,k,l) for each user #k (UE 50) and each subband #i according to the above-mentioned Formula (12) (processing 1001). Then, the scheduler 18 searches the calculated priorities ρ(i,k,l) for the highest value, and then adopts as k' the index of the user corresponding to that priority and adopts as i' the index of the corresponding subband (processing 1002).

When the user #k' corresponding to the highest priority ρ(i',k',l) is already assigned to a subband not adjacent to the subband #i', the situation of a multi carrier signal arises. Thus, preferably, this selection is avoided according to the specification of UL communication of the LTE. Thus, the scheduler 18 can optionally perform adjacent subband checking as to whether the user #k' is already assigned to a subband not adjacent to the subband #i' (processing 1003). When the user #k' is already assigned to a subband not adjacent to the subband #i' (NG at processing 1003), the priority ρ(i',k',l) to this combination is set to be 0 (processing 1004). Then, the highest priority ρ(i,k,l) can be searched for again (processing 1002).

When the result of the subband check indicates no problem (OK at processing 1003), the scheduler 18 assigns the user #k' to the subband #i' (processing 1005). When allocation has been completed for all subbands, the scheduling at the timing #l is terminated (YES route of processing 1006). Otherwise (NO at processing 1006), the scheduler 18 sets all priorities ρ(i',k,l) concerning the subband #i' to be 0 (processing 1007).

The scheduler 18 can optionally calculate the transmission power surplus of each user, for example, according to "maximum transmission power−assigned transmission power". When the transmission power surplus is below a predetermined threshold value (that is, when the transmission power has no sufficient margin), in order to avoid that the user #k' is selected additionally, all priorities ρ(i, k',l) concerning the user #k' may be set to be 0 (from NG route of processing 1008 to processing 1009).

On the other hand, when the transmission power surplus exceeds the threshold value, that is, when the transmission power has a sufficient margin (OK at processing 1008), the scheduler 18 can set the priority ρ(i',k',l) to the combination of the user #k' and the subband #i' to be 0 (processing 1004), and then re-search for the maximum priority ρ(i,k,l) (processing 1002). In this case, the processing 1004 may be bypassed as indicated by a dotted line arrow in FIG. 6.

Then, the scheduler 18 checks whether the priorities ρ(i,k,l) of all users are 0 (processing 1010). When they are all 0, the scheduling at the timing #l is terminated (YES route of processing 1010). When not all are 0, in order that the already assigned combinations may not be re-selected, the corresponding priorities ρ(i',k',l) are set to be 0 (from NO route of processing 1010 to processing 1004), and then the maximum priority ρ(i,k,l) is re-searched for (processing 1002). Here, also in this case, the processing 1004 may be bypassed as indicated by a dotted line arrow in FIG. 6.

As described above, according to the present example, the weight coefficient α in the priority evaluation formula is varied so that users who have a higher tendency of being selected are changed in each frequency (subband). This avoids having particular users fixed to particular radio resources (subbands), and hence permits efficient and flexible allocation of radio resources.

When set up is performed such that the same weight coefficient α is not used for the same frequency in adjacent cells (or sectors), interference between adjacent cells (or sectors) may be suppressed.

Even when the distribution (ratio) of cell edge users and cell center users varies substantially, the change can be treated flexibly. That is, according to the present embodiment, the cell throughput and the cell coverage are improved in comparison with the related art. Further, a scheduling algorithm is provided that can handle a large change in the situation.

(B2) Time/Space Scheduling in MIMO (Without Frequency Scheduling)

Next, description is given for a multiuser MIMO method of the UL, that is, for an example of a BS 10 that performs MIMO receiving in a manner that a plurality of users (UEs 50) are assigned to the same frequency at the same time in the UL.

In the multiuser MIMO method, a plurality of users can perform transmission by using the same frequency at the same time. Thus, the total received power can be increased. On the other hand, in a multi-cell (or sector) environment, interference between cells (or sectors) increases in some cases. In order to avoid this, it is preferable to employ a scheduling method in which the advantage of the multiuser MIMO method is utilized in a state that interference between cells is suppressed.

An example is described below for a case that the number of multiuser (simultaneously transmitting users) is 2. Further, as an example of a receiving method of MIMO, the above-mentioned MMSE-SIC method is employed. As described above, in the MMSE-SIC method, the MMSE equalization and the removal of an interference replica of a transmission signal are performed sequentially by using the determination feedback data after the signal detection.

Figure 7:
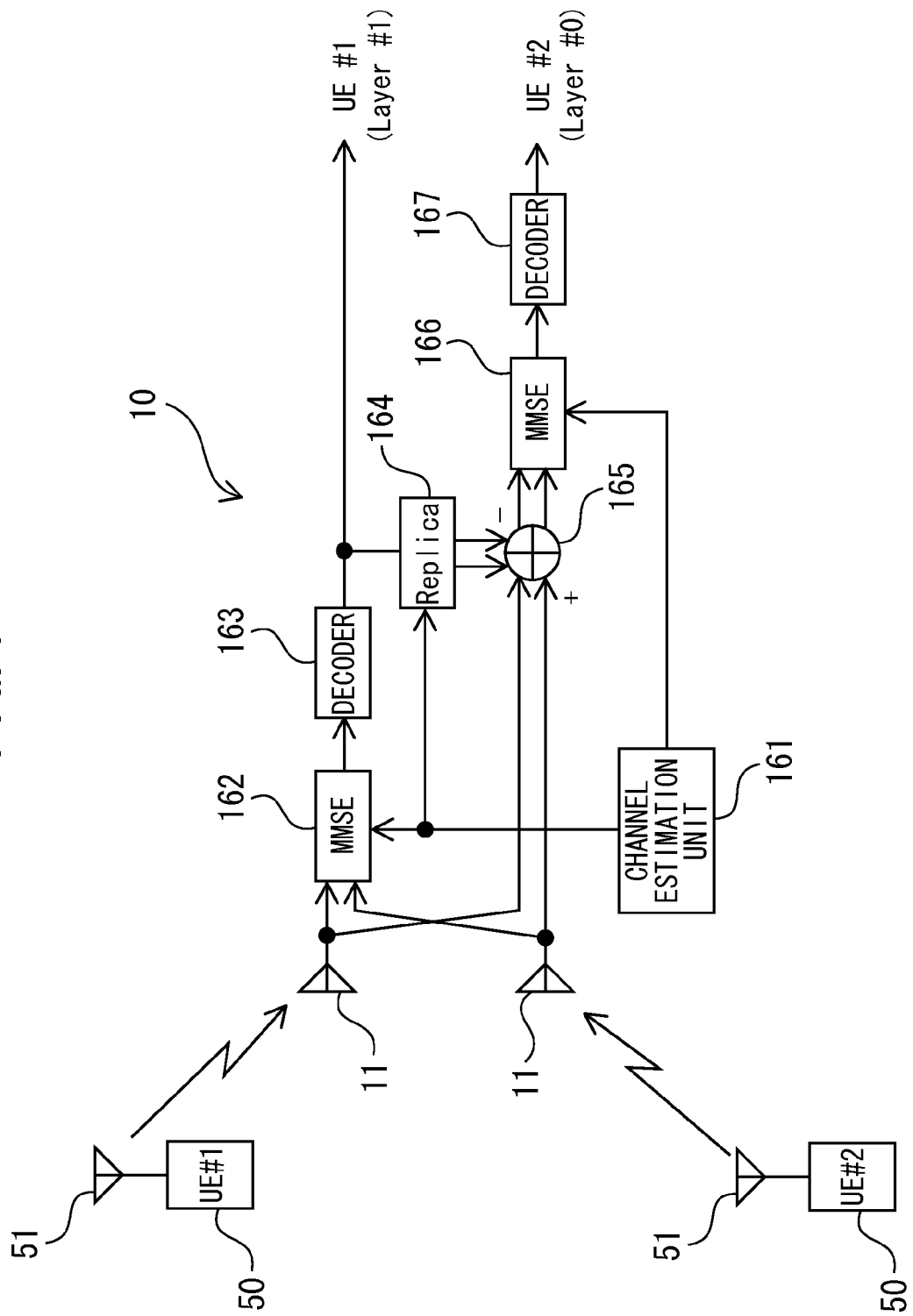
FIG. 7 is a block diagram illustrating an exemplary configuration of a MIMO receiver in a case that an MMSE-SIC method is employed in a BS.

FIG. 7 illustrates an exemplary configuration of a MIMO receiver where the MMSE-SIC method is employed. The MIMO receiver illustrated in FIG. 7 is applicable to the receiving system (e.g., the demodulation and decoding unit 16 illustrated in FIG. 1) of the BS 10 described above.

The MIMO receiver illustrated in FIG. 7 has, for example, two antennas 11 corresponding to the number of multiusers, a channel estimation unit 161, a first MMSE (Minimum Mean Square Error) equalizer 162, a first decoder 163, a replica generating unit 164, a subtractor 165, the second MMSE equalizer 166, and a second decoder 167.

Each antenna 11 is a radio interface for receiving a radio signal transmitted from the UE 50. In the present example, radio signals transmitted at the same frequency at the same time by two sets (UE #1, UE #2) of UEs 50 through the antennas 51 respectively are received by the antenna 11. Here, the antenna 11 corresponds to a receiving antenna branch, while the antenna 51 corresponds to a transmission antenna branch.

The channel estimation unit 161 calculates channel estimate values relative to the UEs #1 and #2 by using UL reference signals (pilot signals) received from the UEs #1 and #2.

By means of a linear filter based on a minimum mean square error (MMSE) method, the MMSE equalizer 162 separates MIMO received signals that are independently transmitted from the antennas (transmission antenna branches) 51 of the UEs #1 and #2 respectively and then mixed in space and received through each antenna (receiving antenna branch) 11 of the MIMO receiver. When OFDM (or OFDMA), SC-FDMA, or the like is used in the wireless access method, the received signal of each receiving antenna branch 51 may be recognized as a signal of each subcarrier after Fast Fourier Transform (FFT).

By using the channel estimate values calculated by the channel estimation unit 161, the first MMSE equalizer 162 calculates an MMSE weight for suppressing interference from the other transmission antenna branch 51 for each transmission antenna branch 51, that is, for each of UE #1 and UE #2. Then, the first MMSE equalizer 162 multiplies the MMSE weight matrix to the received signal vector so as to suppress the interference from the other transmission antenna branch 51 by MMSE equalization for each transmission antenna branch 51. On the basis of the square Euclidean distance between the equalized signal and each transmission signal point replica, the Logarithmic Likelihood Ratio (LLR) serving as reliability information of each bit is calculated and then provided to the first decoder 163.

The first decoder 163 decodes (soft decision decoding) the received signal sequence by using the LLR provided from the first MMSE equalizer 162.

The replica generating unit 164 re-encodes decode data decoded by the first decoder 163 and having a CRC result of OK. On the basis of the re-encoding data and the channel estimate value obtained by the channel estimation unit 161, the replica generating unit 164 generates an interference (received signal) replica signal concerning the one transmission antenna branch 51 (UE #1).

The subtractor 165 subtracts the replica signal (interference component) from the signal sequence received by each receiving antenna branch 11 so as to cancel it out.

Under the assumption that the received signal from UE #1 is not present, the second MMSE equalizer 166 performs MMSE equalization on the received signal sequence in which the interference component has been canceled by the subtractor 165. As a result, the second MMSE equalizer 166 obtains an equalized signal and an LLR concerning the other transmission antenna branch 51 (UE #2).

The second decoder 167 decodes (soft decision decoding) the equalized signal by using the LLR provided from the second MMSE equalizer 166.

As such, in the MMSE-SIC method, the received signal sequence from each transmission antenna branch 51 is equalizes and decoded in predetermined order. Also, in a case that the number of multiuser is three or greater, equalization and decoding are repeated similarly in predetermined order. The number of multiusers may be recognized as the number of data streams.

As described above, each stage in which equalization and decoding are performed in such order is referred to as a "layer" in the present embodiment. From the viewpoint of UL scheduling, it is preferable that the UE #1 corresponding to a layer in which equalization and decoding are performed first undergoes scheduling after the UE #2 corresponding to a layer in which equalization and decoding are performed later. In the present embodiment, illustratively, the index of the layer corresponding to the UE #2 in which scheduling is performed first is defined to be 0, while the index of the layer corresponding to the UE #1 in which scheduling is performed later is defined to be 1.

In this case, in the BS 10, for example, the SIR measurement unit 13 can calculate the receiving SIR(γj) of the layer #j according to the following Formula (13)

$$\gamma_0 = h_0^H h_0 / \sigma^2$$

$$\gamma_1 = h_1^H (h_0 h_0^H + \sigma^2 I)^{-1} h_1 \qquad (13)$$

Here, γj denotes the receiving SIR, j is the index of the layer and specifies the sequence of selecting a user (UE 50) (performing scheduling) (in space domain). Further, hj denotes the channel vector of the user selected in the layer #j, xH denotes the conjugate transposition of the vector x, σ2 denotes the average interference power, and I denotes the unit matrix. The SIR of the layer #1 (UE #1) is calculated after the user #2 of the layer #0 is determined.

Then, by using the SIR of each layer #j, the scheduler 18 calculates the scheduling parameter (priority) ρ(j,k,l) of each layer #j according to the following Formula (14), and then allocates a transmission opportunity to a user having the highest scheduling parameter ρ(j,k,l).

$$\rho_{j,k,l} = \frac{r_{j,k,l}}{R_{k,l}^{\alpha_j}} \qquad (14)$$

Here, Rk,l denotes the average throughputs of the user #k at the timing #l, and rj,k,l denotes the instantaneous throughputs of the user #k in the layer #j. These values are obtained from the calculation result of the above-mentioned SIR Formula (13). Symbol αj denotes the weight coefficient for the layer #j.

Where the number of multiusers is 2, for example, it is assumed that the weight coefficient for the layer #0 is α0=1 and that the weight coefficient for the layer #1 is α1=0. Then, for example, in the layer #0, cell edge users have a higher tendency of being selected. Further, in the layer #1, cell center users have a higher tendency of being selected.

Figure 8:
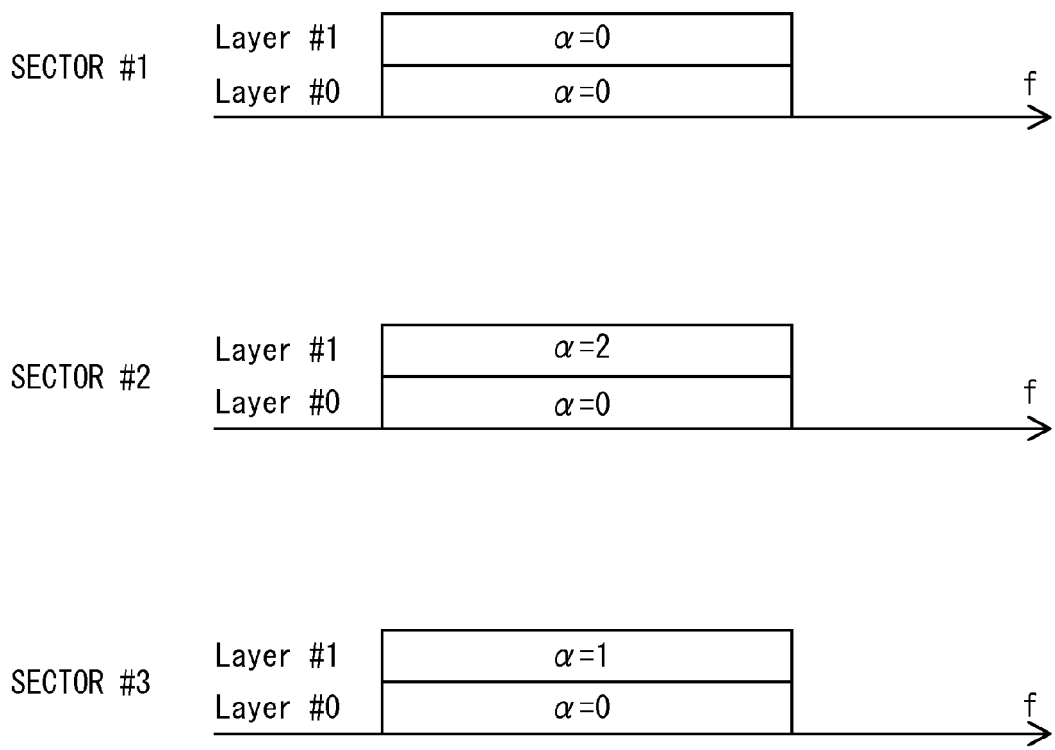
FIG. 8 is a diagram illustrating an example of weight coefficient setting for individual layers in a BS employing a MIMO receiver illustrated in FIG. 7.

Thus, for example, when the weight coefficient αj of at least any one of the layers #j is set into a different value between adjacent sectors, interference between the cells (sectors) may be suppressed. An embodiment of this is illustrated in FIG. 8. Here, FIG. 8 illustrates merely an example, and does not limit the present invention.

Figure 9:
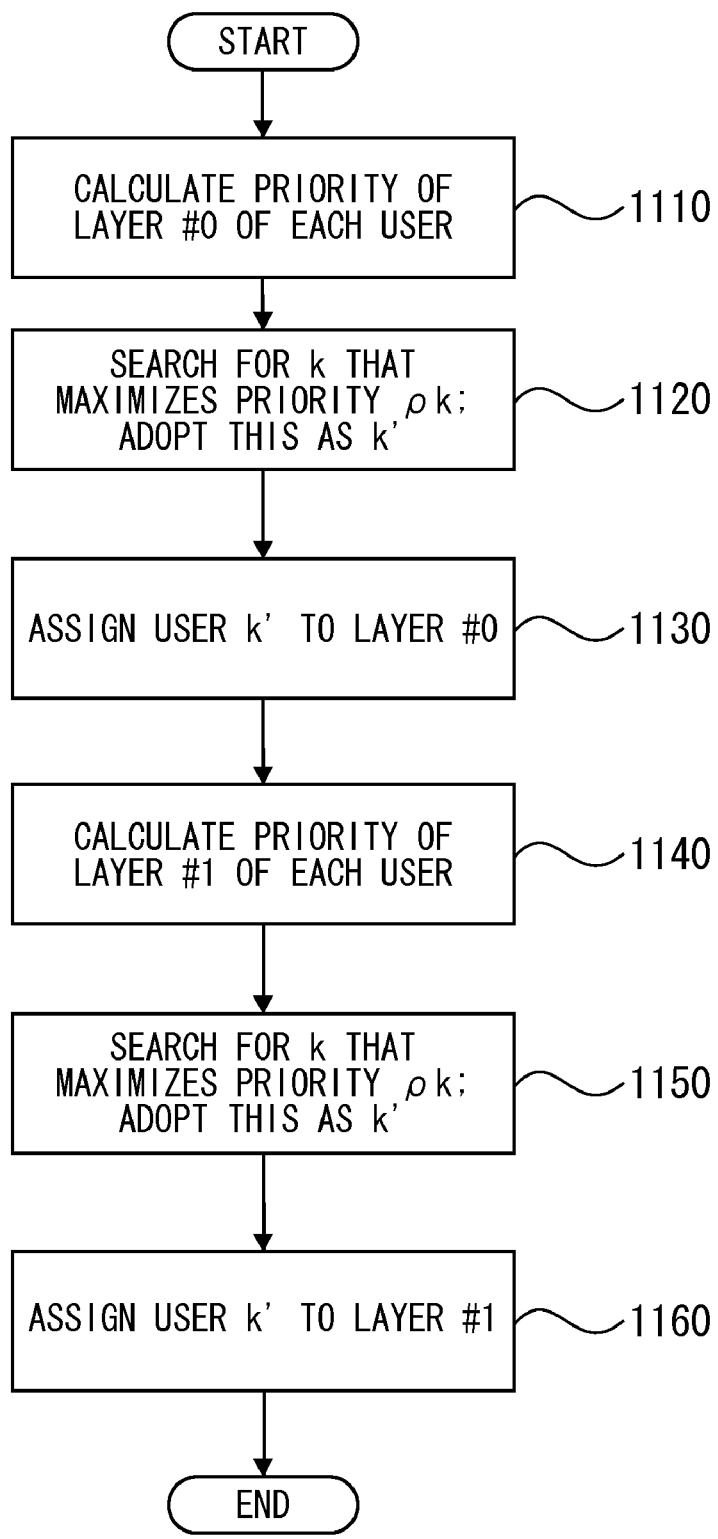
FIG. 9 is a flow chart describing an example of time/space scheduling performed by a scheduler of a BS employing a MIMO receiver illustrated in FIG. 7.

FIG. 9 illustrates an example of UL scheduling (time/space scheduling) performed by the BS 10 (scheduler 18) in the present embodiment. The flow chart illustrated in FIG. 9 is executed repeatedly with a predetermined scheduling period.

At a timing #l in a particular scheduling cycle, the scheduler 18 calculates a priority ρ(j,k,l) for each user #k in the layer #j (=0) according to the above-mentioned Formula (14) (processing 1110). The scheduler 18 searches for a user #k having the highest priority ρ(j,k,l), adopts the user #k as a user #k' (processing 1120), and then assigns the user #k' to the layer #0 (processing 1130).

Next, the scheduler 18 calculates the priority ρ(j,k,l) of a different layer #j (=1) of a remaining user #k (≠k') having not yet been selected in the layer #0, according to Formula (14) (processing 1140). Then, the scheduler 18 searches for a user #k having the highest priority ρ(j,k,l), adopts the user #k as a user #k' (processing 1150), and then assigns the user #k' to the layer #j (=1) (processing 1160).

As described above, according to the present embodiment, when the weight coefficient α in the priority evaluation formula is controlled (set up) for each layer, a user having a higher tendency of being selected can be varied for each layer. This avoids having particular users fixed to particular layers, and hence permit efficient and flexible allocation of layers serving as an example of radio resources.

When set up is performed such that the same weight coefficient α is not used for the same layer in adjacent cells (or sectors), interference between adjacent cells (or sectors) may be suppressed.

Further, even when distribution (ratio) of users (e.g., cell edge users) having a lower average throughput and users (e.g., cell center users) having a higher average throughput varies remarkably, this change can be treated flexibly. That is, according to the present embodiment, the cell throughput and the cell coverage are improved in comparison with the related art. Further, a scheduling algorithm is provided that can handle a large change in the situation.

(B3) Time/Frequency/Space Scheduling in MIMO

The inter-layer (space) scheduling and the frequency scheduling in MIMO described above can be performed in combination. In this case, for example, according to the following Formula (15), the scheduler 18 can calculate the priority ρ(i,j,k,l) of the user #k at the timing #l in the subband #i and the layer #j.

$$\rho_{i,j,k,l} = \frac{r_{i,j,k,l}}{R_{k,l}^{\alpha_{i,j}}} \qquad (15)$$

Figure 10:
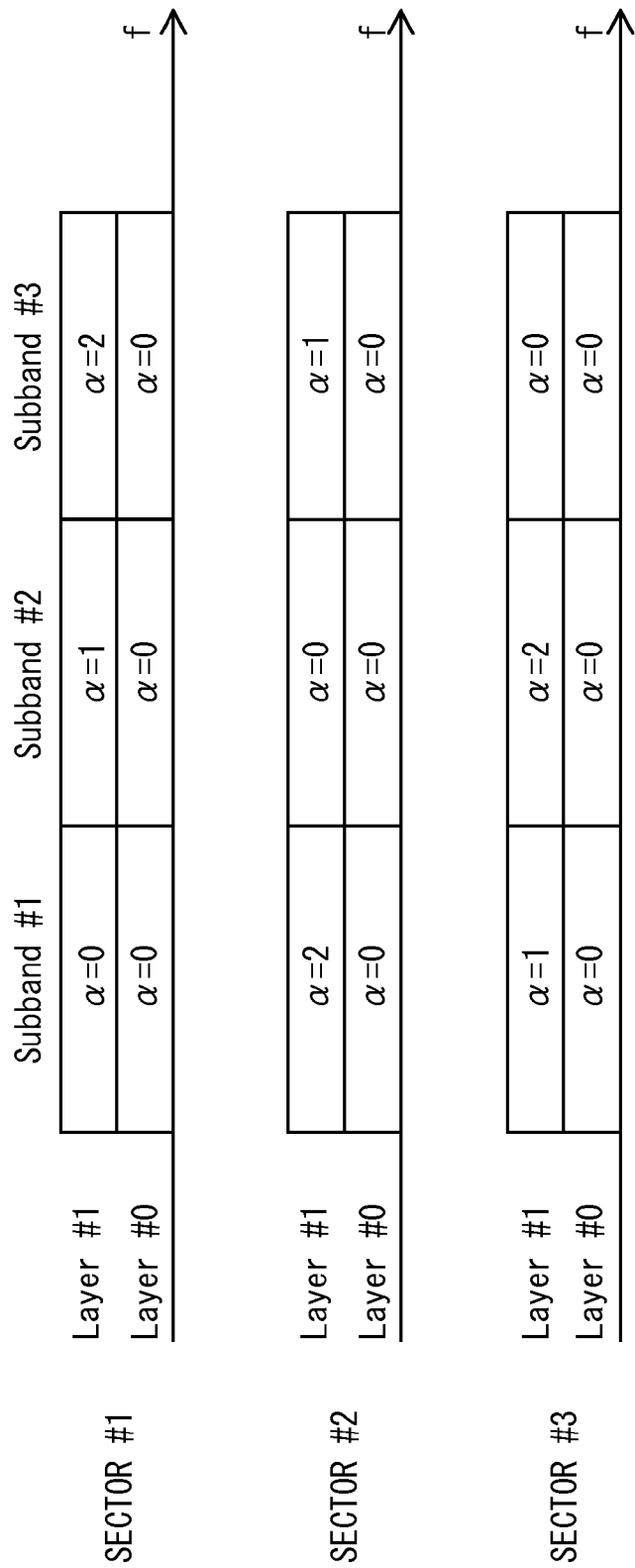
FIG. 10 is a diagram illustrating an example of weight coefficient setting for individual frequencies (subbands) and individual layers in a BS employing a MIMO receiver illustrated in FIG. 7.

That is, a different weight coefficient α(i,j) may be used for each layer #j and each subband #i. FIG. 10 illustrates an example of assignment (setting) of the weight coefficient α (i,j).

Figure 11:
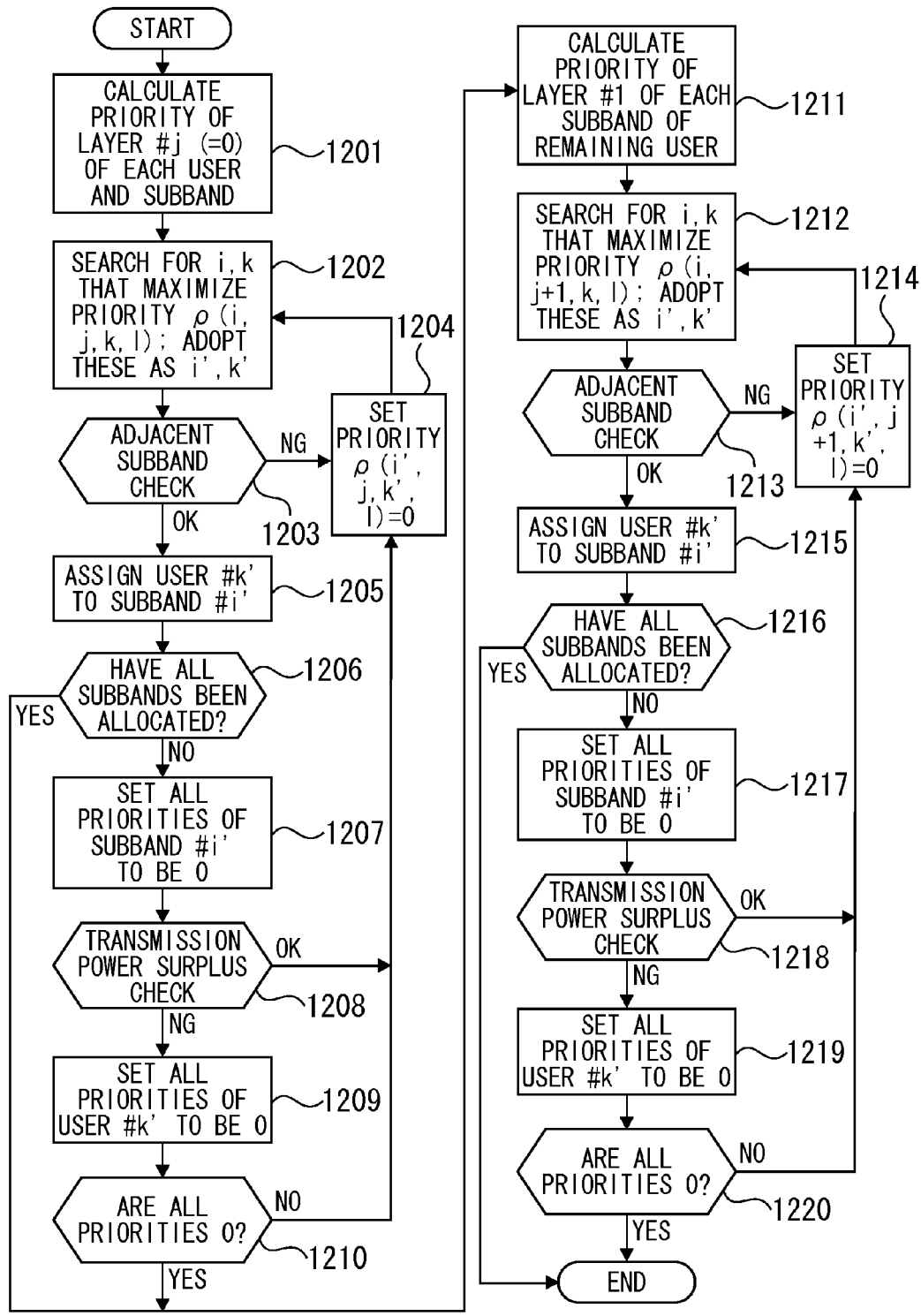
FIG. 11 is a flow chart describing an example of time/frequency/space scheduling performed by a scheduler of a BS employing a MIMO receiver illustrated in FIG. 7.

FIG. 11 illustrates an example of the time/frequency/space scheduling performed by the scheduler 18 of the present embodiment. The number of layers (the number of multiuser) is assumed to be 2 (layer #0 and layer #1) similarly to item (B2). Further, the flow chart illustrated in FIG. 11 is executed repeatedly with a predetermined scheduling period.

At a timing #l in a particular scheduling cycle, the scheduler 18 calculates a priority ρ(i,j,k,l) for each user #k and each subband #i in the layer #j (j=0) according to the above-mentioned Formula (15) (processing 1201). Then, the scheduler 18 searches the calculated priorities ρ(i,j,k,l) for the highest value, and then adopts as k' the index of the user corresponding to that priority and adopts as i' the index of the corresponding subband (processing 1202).

Also in the present example, as described above, when the user #k' corresponding to the highest priority ρ(i',j,k',l) is already assigned to a subband not adjacent to the subband #i', the situation of a multi carrier signal arises. Thus, preferably, this selection is avoided according to the specification of UL communication of the LTE. Thus, the scheduler 18 performs adjacent subband checking as to whether the user #k' is already assigned to a subband not adjacent to the subband #i' (processing 1203). When the assignment has already been performed (NG at processing 1203), the priority ρ(i',j,k',l) to this combination is set to be 0 (processing 1204). Then, the highest priority ρ(i,j,k,l) can be searched for again (processing 1202).

When the result of the subband checking indicates no problem (OK at processing 1203), the scheduler 18 assigns the user #k' to the layer #j (=0) and the subband #i' (processing 1205). When the assignment to all subbands is not yet completed (NO at processing 1206), the scheduler 18 sets all priorities ρ(i',j,k,l) concerning the subband #i' to be 0 (processing 1207).

The scheduler 18 can optionally calculate the transmission power surplus of each user, for example, according to "maximum transmission power−assigned transmission power". When the transmission power surplus is below a predetermined threshold value (that is, when the transmission power has no sufficient margin), in order to avoid that the user #k' is selected additionally, the scheduler 18 can set all priorities ρ(i,j,k',l) concerning the user #k' to be 0 (from NG route of processing 1208 to processing 1209).

On the other hand, when the transmission power surplus exceeds the threshold value, that is, when the transmission power has a sufficient margin (OK at processing 1208), the scheduler 18 can set the priority ρ(i',j,k',l) to the combination of the user #k', the layer #j and the subband #i' to be 0 (processing 1204), and then re-search for the maximum priority ρ(i,j,k,l) (processing 1202). In this case, the processing 1204 may be bypassed similarly to the case illustrated in FIG. 6.

Then, the scheduler 18 checks whether the priorities ρ(i,j,k,l) of all users are 0 (processing 1210). When not all are 0, in order that the already assigned combinations may not be re-selected, the corresponding priorities ρ(i',j,k',l) are set to be 0 (from NO route of processing 1210 to processing 1204), and then the maximum priority ρ(i,j,k,l) is re-searched for (processing 1202). Here, also in this case, the processing 1204 may be bypassed similarly to the case illustrated in FIG. 6.

On the other hand, when the priorities ρ(i,j,k,l) concerning all users are 0 (YES at processing 1210), and when the allocation has been completed for all subbands at the above-mentioned processing 1206 (YES at processing 1206), the scheduler 18 calculates the priorities (i,j+1,k,l) of the remaining users in the layer #j+1 (=1) of each subband #i according to Formula (15) (processing 1211).

Then, the scheduler 18 searches the calculated priorities ρ(i,j+1,k,l) for the highest value, and then adopts as k' the index of the user corresponding to that priority and adopts as i' the index of the corresponding subband (processing 1212).

The scheduler 18 can optionally perform adjacent subband checking as to whether the user #k' is already assigned to a subband not adjacent to the subband #i' (processing 1213). When the user #k' is already assigned to a subband not adjacent to the subband #i' (NG at processing 1213), the scheduler 18 sets the priority ρ (i', j+1, k',l) of this combination to be 0 (processing 1214). Then, the highest priority ρ(i,j+1,k,l) can be searched for again (processing 1212).

When the result of the subband check indicates no problem (OK at processing 1213), the scheduler 18 assigns the user #k' to the layer #j+1 (=1) and the subband #i' (processing 1215). When the assignment to all subbands is not yet completed (NO at processing 1216), the scheduler 18 sets all priorities ρ(i',j+1,k,l) concerning the subband #i' to be 0 (processing 1217).

The scheduler 18 can optionally calculate the transmission power surplus of each user, for example, according to "maximum transmission power−assigned transmission power". When the transmission power surplus is below a predetermined threshold value (that is, when the transmission power has no sufficient margin), in order to avoid that the user #k' is selected additionally, the scheduler 18 can set all priorities ρ(i,j+1,k',l) concerning the user #k' to be 0 (from NG route of processing 1218 to processing 1219).

On the other hand, when the transmission power surplus exceeds the threshold value, that is, when the transmission power has a sufficient margin (OK at processing 1218), the scheduler 18 can set the priority ρ(i',j+1,k',l) to the combination of the user #k', the layer #j+1 and the subband #i' to be 0 (processing 1214), and then re-search for the maximum priority ρ(i,j,k,l) (processing 1212). Here, also in this case, the processing 1214 may be bypassed similarly to the case illustrated in FIG. 6.

Then, the scheduler 18 checks whether the priorities ρ(i,j+1,k,l) of all users are 0 (processing 1220). When not all are 0, in order that the already assigned combinations may not be re-selected, the corresponding priorities ρ(i',j,k',l) are set to be 0 (from NO route of processing 1220 to processing 1214), and then the maximum priority ρ(i,j,k,l) is re-searched for (processing 1212). Here, also in this case, the processing 1214 may be bypassed similarly to the case illustrated in FIG. 6.

On the other hand, when the priorities ρ(i,j,k,l) concerning all users are 0 (YES at processing 1210), the scheduler 18 terminates the scheduling at the timing #l. If the number of multiusers (the number of layers) is three or greater, it is sufficient that processing 1211 to processing 1220 are repeated for different layers.

As described above, according to the present embodiment, when the weight coefficient α in the priority evaluation formula is controlled for each frequency (subband) and each layer, a user having a higher tendency of being selected can be varied in each frequency (subband) and each layer. This avoids having particular users fixed to particular frequency bands or particular layers, and hence permits efficient and flexible allocation of the frequency and the layer.

When set up is performed such that the same weight coefficient α is not used for the same frequency band and the same layer in adjacent cells (or sectors), interference between adjacent cells (or sectors) may be suppressed.

Even when the distribution (ratio) of cell edge users and cell center users varies substantially, the change can be treated flexibly. That is, according to the present example, the cell throughput and the cell coverage are improved in comparison with the related art. Further, a scheduling algorithm is provided that can treat a large change in the situation.

(B4) Case that Interference Amount is Known Between BSs

In the LTE, the interference amount of an UL can be notified to each other between the BSs 10 via the network. In this case, when the interference amount imparted to other cells (or sectors) is large, the parameter of transmission power control may be changed. Here, in place of transmission power control or alternatively together with transmission power control, when the parameter (weight coefficient α) concerning the subband is set up such that cell edge users may have a lower tendency of assignment as described above, interference with other cells (sectors) may be reduced.

An embodiment of this is described below with reference to FIGS. 12 and 13.

Figure 12:
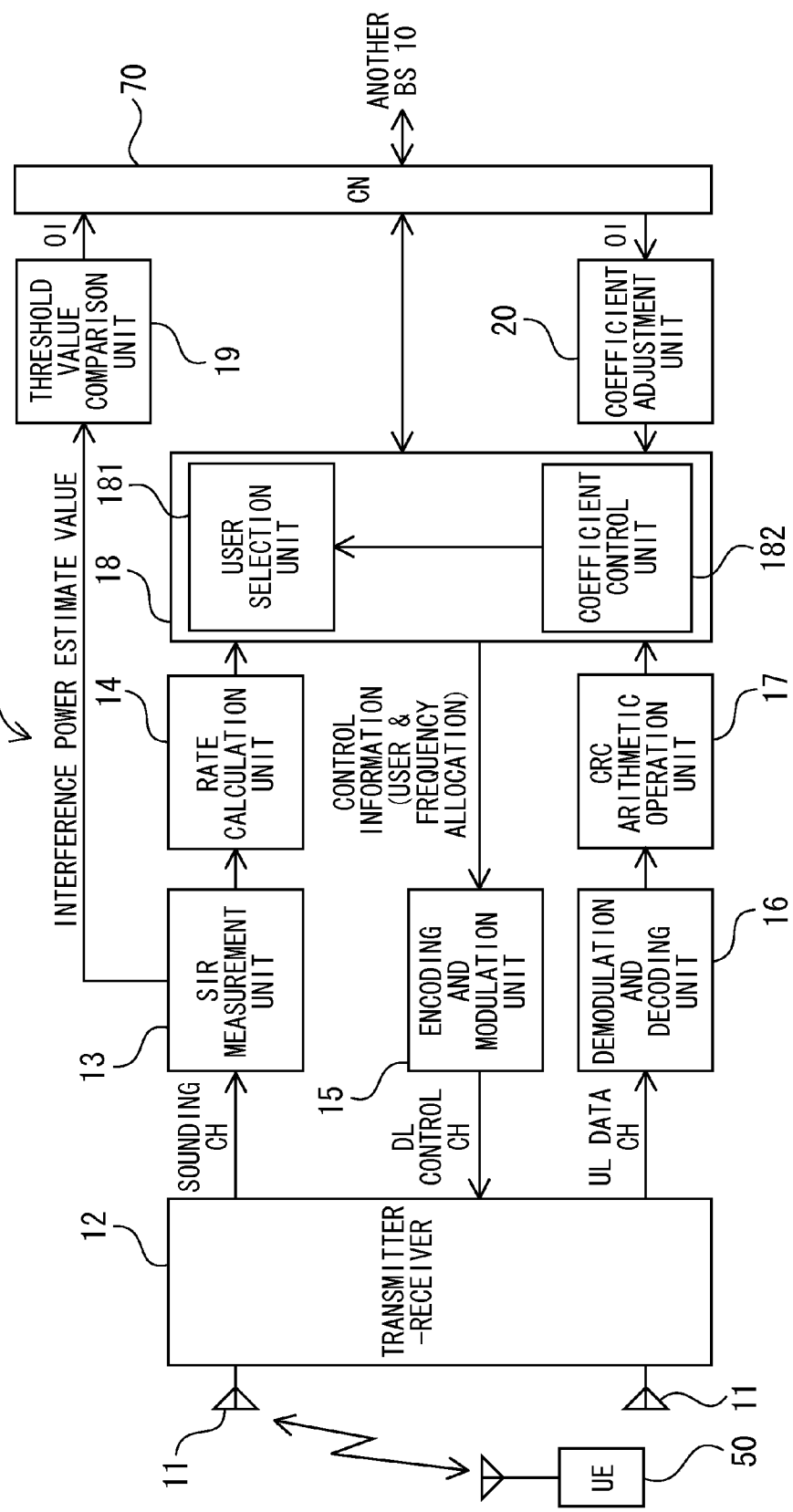
FIG. 12 is a block diagram illustrating a modification of a BS according to an embodiment.

FIG. 12 is a block diagram illustrating an exemplary configuration of the BS 10 of the present embodiment. The BS 10 illustrated in FIG. 12 is connected to other BSs 10 via a core network (CN) 70 in a manner permitting communication, and hence can perform inter-BS communication via the CN 70. In addition to the configuration illustrated in FIG. 1, the BS 10 further has a threshold value comparison unit 19 and a coefficient adjustment unit 20. In FIG. 12, parts designated by like numerals described above are substantially like parts described above, unless mentioned otherwise.

The threshold value comparison unit 19 compares with a predetermined threshold value the interference power that serves as an example of information concerning the interference amount and that is measured for each subband by using the known received signal of the sounding channel by the SIR measurement unit 13. When the interference power exceeds the threshold value, the threshold value comparison unit 19 notifies the situation to other BSs 10, for example, in the form of an OI (Overload Indicator).

When an OI is notified from another BS 10, the coefficient adjustment unit 20 instructs the scheduler 18 (coefficient control unit 182) such as to control (reduce) the weight coefficient αi used in the scheduler 18 for the subband #i specified by the OI. This function of the coefficient adjustment unit 20 may be included in the coefficient control unit 182.

When receiving the instruction, the scheduler 18 (coefficient control unit 182) reduces the weight coefficient α of the corresponding subband. As a result, the probability is reduced that cell edge users are assigned to the subband.

Figure 13:
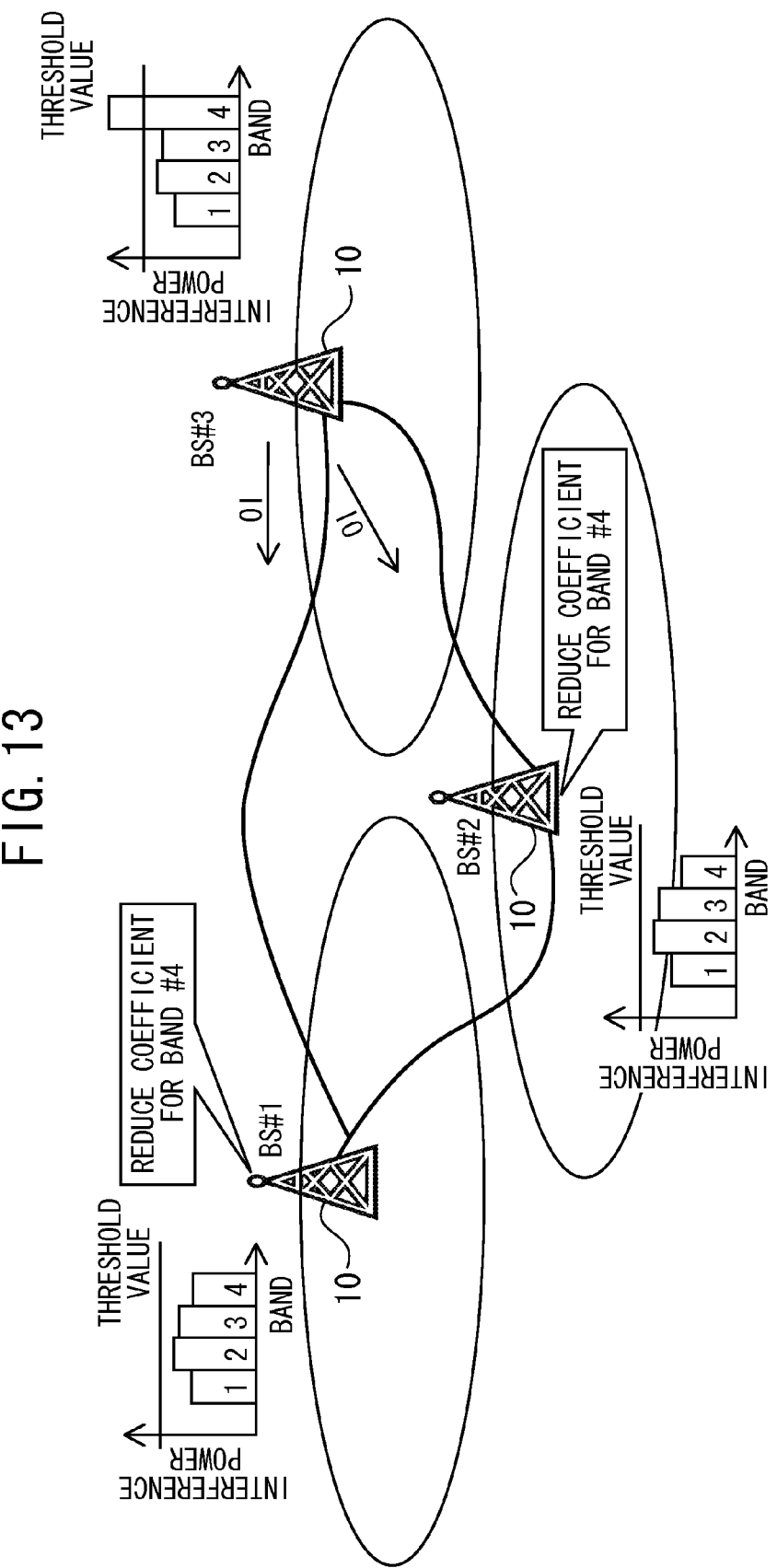
FIG. 13 is a conceptual diagram describing an example of weight coefficient control performed by a BS illustrated in FIG. 12.

For example, as illustrated in FIG. 13, in a situation that three BSs #1, #2, and #3 are installed and that subbands #1 to #4 available to them are set up, when the threshold value comparison unit 19 of the BS #3 detects an interference power exceeding a threshold value in the subband #4, an OI is notified from the BS #3 to the other BS #1 and BS #2, respectively.

In each of the BS #1 and the BS #2, when receiving the OI from the BS #3, the coefficient adjustment unit 20 reduces the weight coefficient α4 used for the subband #4 specified by the OI.

As a result, in the scheduler 18 of each of the BS #1 and the BS #2, the probability is reduced that users (e.g., cell edge users) having a smaller average throughput are assigned to the subband #4. This reduces interference with other cells (sectors).

(B5) The Case where Gains in Adjacent Cells (or Sectors) are Taken into Consideration By using the known DL signal, the user (UE 50) measures the average received power from the BS 10 of each of adjacent cells of the BS (serving BS) 10 (serving cell) under connection. Further, the transmission power of the BS 10 may be received, for example, as notice information of the DL by the UE 50.

By using these, the UE 50 can obtain the propagation path gain (inverse of the propagation path loss) G of the DL with each BS 10. Then, the UE 50 notifies this value (the path gain or gains relative to a plurality or one of top-ranked BSs 10, or alternatively their sum) to the serving BS 10 in the form of a control signal of the UL. When it is assumed that the long-term path gains of the propagation path of the DL and the propagation path of the UL are almost equal to each other, the serving BS 10 can treat the propagation path gain notified from the UE 50, as the path gain of the UL. This value for a user #k is expressed by Gk.

In the BS 10, the scheduler 18 can perform scheduling of the UL with accurately taking into consideration the interference between cells by using the path gain Gk. For example, the scheduler 18 can calculate the priority (scheduling parameter) ρ by using a formula that includes a path gain Gk as a parameter as illustrated in any one of the following formulas (16) to (18) in place of the use of the priority formula described above.

$$\rho_{i,k,l} = \frac{r_{i,k,l}}{R_{k,l}^{\alpha_i}} G_k^{\beta_i} \quad (16)$$

$$\rho_{j,k,l} = \frac{r_{j,k,l}}{R_{k,l}^{\alpha_j}} G_k^{\beta_j} \quad (17)$$

$$\rho_{i,j,k,l} = \frac{r_{i,j,k,l}}{R_{k,l}^{\alpha_{i,j}}} G_k^{\beta_{i,j}} \quad (18)$$

Here, the path gain Gk of an adjacent cell indicates the path gain relative to a BS 10 having the second highest gain in comparison with the serving BS 10 or alternatively the sum of the path gains relative to a plurality of top-ranked BSs 10 having a higher gain other than the serving BS 10. Symbol β (second coefficient) indicates a coefficient (parameter) that can have a different value between subcarriers (subbands) #i or alternatively between transmission streams (layers) #j. The coefficient β may be a parameter set up (controlled) independently of α (first coefficient), or alternatively may be a function of α.

That is, in performing time/frequency scheduling, the scheduler 18 may use Formula (16). In performing time/space scheduling, the scheduler 18 may use Formula (17). In performing time/frequency/space scheduling, the scheduler 18 may use Formula (18).

Here, when the value of βi,j is increased, users that impart a greater amount of interference to other cells have a higher tendency of being assigned. On the contrary, when the value is reduced, users that impart a smaller amount of interference to other cells have a higher tendency of being assigned.

Figure 14:
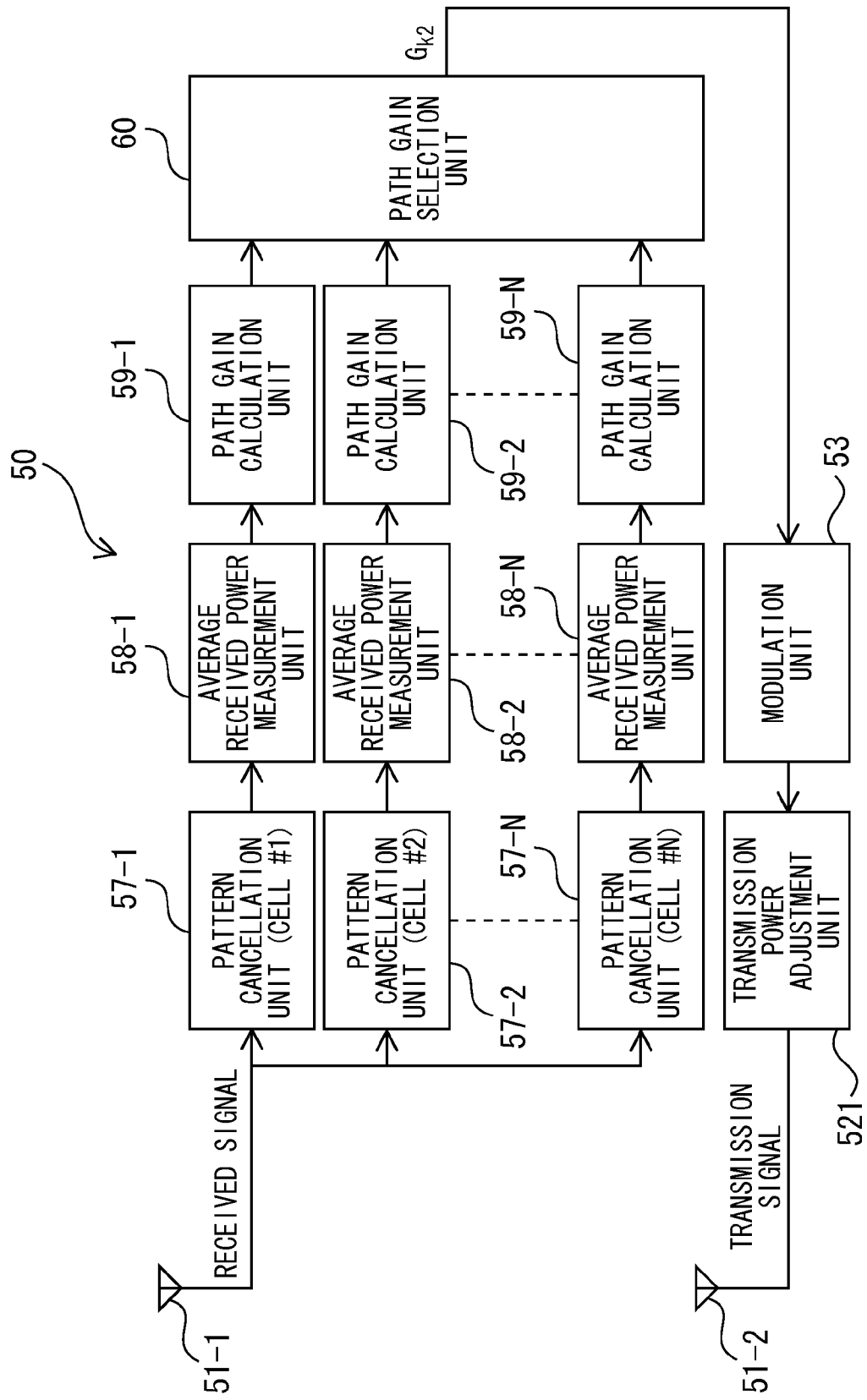
FIG. 14 is a block diagram illustrating an exemplary configuration of a UE in a case that scheduling is performed taking into consideration gains in adjacent cells (or sectors).

FIG. 14 illustrates an exemplary configuration of the UE 50 of the present embodiment. FIG. 15 illustrates an exemplary configuration of the BS 10.

(UE)

The UE 50 illustrated in FIG. 14 has, for example: a receiving antenna 51-1; a transmission antenna 51-2; groups of pattern cancellation units 57-1 to 57-N, average received power measurement units 58-1 to 58-N, and path gain calculation units 59-1 to 59-N corresponding to the number of adjacent cells (#1 to #N); a path gain selection unit 60; a modulation unit 53; and a transmission power adjustment unit 521.

The receiving antenna 51-1 is a radio interface for receiving a radio signal transmitted from the BS 10. In the present embodiment, radio signals from a plurality (N pieces) of adjacent cells (BSs 10) may be received by the receiving antenna 51-1. This receiving radio signal may contain a common reference signal serving as a reference signal. The common reference signal may be used as a signal pattern specific to each cell.

The transmission antenna 51-2 is the radio interface for transmitting a radio signal of the BS 10. These antennas 51-1 and 51-2 may be composed of a single antenna shared in transmission and receiving.

The pattern cancellation unit 57-p (p=1 to N) detects a received signal sequence of a cell #p from a received signal sequence by multiplying a signal pattern of the common reference signal specific to the cell #p onto the signal sequence received through the receiving antenna 51-1. That is, the signal sequence received through the receiving antenna 51-1 is separated into signal sequences of individual cells #p by the pattern cancellation unit 57-p.

Here, the signal inputted to each pattern cancellation unit 57-p corresponds to a signal in a form that can be processed by signal processing in the individual units 57-p, 58-p, and 59-p after being received by the receiving antenna 51-1, that is, for example, a signal obtained by wireless receive processing such as low noise amplification, down conversion into baseband frequency, and AD conversion performed in the transmitter-receiver 52 (see FIG. 1) described above.

The average received power measurement unit 58-p measures the average received power of the received signal sequence of the cell #p detected by the corresponding pattern cancellation unit 57-p.

On the basis of the average received power measured by the corresponding average received power measurement unit 58-p, the path gain calculation unit 59-p calculates the path gain Gk from the cell #p. For example, when the transmission power of the BS 10 is recognized by means of receiving of the notice information, the value obtained by subtracting the received power from the transmission power may be adopted as the path gain Gk.

The path gain selection unit 60 adopts as the path gain to an adjacent cell the second highest path gain (referred to as Gk2) among the path gains Gk of the cells #1 to #N calculated by the individual path gain calculation units 59-1 to 59-N, and then incorporates this information, for example, into a signal (referred to as a UL control signal, hereinafter) of control channel of the UL.

The UL control signal is inputted to the modulation unit 53. Then, the modulation unit 53 modulates the UL control signal by a modulation method such as QPSK, 16QAM, and 64QAM.

The modulated signal is inputted to the transmission power adjustment unit 521. Then, the transmission power adjustment unit 521 adjusts the transmission power of the modulated UL control signal, and then transmits the signal to the BS 10 through the transmission antenna 51-2.

(BS)

On the other hand, the difference in the configuration of the BS 10 illustrated in FIG. 15 from the configuration of the BS 10 illustrated in FIG. 1 is that a path gain receiving unit 21 is added. Here, in this FIG. 15, parts designated by like numerals described above are substantially like parts described above, unless mentioned otherwise.

The path gain receiving unit 21 receives the information concerning the path gain Gk2 (the UL control signal) having been transmitted by the UE 50 by using the control channel of the UL as described above, and then outputs the information to the scheduler 18. Here, the UL control channel signal is separated by the transmitter-receiver 12.

By using the received path gain Gk2, the scheduler 18 performs calculations according to any one of the above-mentioned Formulas (16) to (18), so as to obtain the priority (scheduling parameter) ρ in which interference between cells is accurately taken into consideration.

The technique disclosed above permits efficient and flexible allocation of radio resources. Further, this technique suppresses radio interference between adjacent cells (or sectors). All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A radio resource allocation control apparatus for controlling allocation of radio resources used in communication by a plurality of user equipment in a wireless communication system, said apparatus comprising:
a selecting unit for selecting a user equipment to which said allocation is performed by using a priority evaluation formula in which a plurality of user equipment having wireless communication characteristics that have a higher tendency of being selected as a target of said allocation vary when different coefficients are imparted; and
a control unit for controlling said coefficients individually for said radio resources,
wherein said control unit controls said coefficients to the same radio resource to be mutually different values in adjacent cells or sectors in said wireless communication system.

2. The radio resource allocation control apparatus according to claim 1, wherein said control unit controls said coefficients individually for a plurality of frequency bands available as said radio resources in said wireless communication system.

3. The radio resource allocation control apparatus according to claim 2, wherein said selecting unit selects said user equipment serving as an allocation target, on the basis of a priority obtained according to the following priority evaluation formula (5):

$$\rho_{i,k,l} = \frac{r_{i,k,l}}{R_{k,l}^{\alpha_i}} \quad (5)$$

where k is an index of said user equipment, l is an index of timing, i is an index of said frequency band, $r_{i,k,l}$ denotes an instantaneous throughput of a user equipment #k at a timing #l in a frequency band #i, $R_{k,l}$ denotes an average throughput of a user equipment #k up to a timing #l, and $\alpha_i$ denotes said coefficient for a frequency band #i.

4. The radio resource allocation control apparatus according to claim 1, wherein said control unit controls said coefficients individually for layers serving as said radio resources and indicating a sequence of demodulating and decoding signals received from said plurality of user equipment.

5. The radio resource allocation control apparatus according to claim 4, wherein said selecting unit selects said user equipment serving as an allocation target, on the basis of a priority obtained according to the following priority evaluation formula (6):

$$\rho_{j,k,l} = \frac{r_{j,k,l}}{R_{k,l}^{\alpha_j}} \quad (6)$$

where k is an index of said user equipment, l is an index of timing, j is an index of said layer, $r_{j,k,l}$ denotes an instantaneous throughput of a user equipment #k at a timing #l in a layer #j, $R_{k,l}$ denotes an average throughput of a user equipment #k up to a timing #l, and $\alpha_j$ denotes said coefficient for a layer #j.

6. The radio resource allocation control apparatus according to claim 1, wherein said control unit controls said coefficients individually for a plurality of frequency bands available as said radio resources in said wireless communication system and for layers serving as said radio resources and indicating a sequence of demodulating and decoding signals received from said plurality of user equipment.

7. The radio resource allocation control apparatus according to claim 6, wherein said selecting unit selects said user equipment serving as an allocation target, on the basis of a priority obtained according to the following priority evaluation formula (7):

$$\rho_{i,j,k,l} = \frac{r_{i,j,k,l}}{R_{k,l}^{\alpha_{i,j}}} \quad (7)$$

where k is an index of said user equipment, l is an index of timing, i is an index of said frequency band, j is an index of said layer, $r_{i,j,k,l}$ denotes an instantaneous throughput of a user equipment #k at a timing #l in a frequency band #i in the layer #j, $R_{k,l}$ denotes an average throughput of a user equipment #k up to a timing #l, and $\alpha_{i,j}$ denotes said coefficient for said frequency band #i and said layer #j.

8. The radio resource allocation control apparatus according to claim 1, wherein said wireless communication characteristics are imparted on the basis of an instantaneous throughput and an average throughput of communication between said plurality of user equipment.

9. The radio resource allocation control apparatus according to claim 1, wherein said control unit controls said coefficients in such a direction that an interference amount may be suppressed, on the basis of information concerning the interference amount notified from base stations in adjacent cells or sectors in said wireless communication system.

10. The radio resource allocation control apparatus according to claim 1, wherein said wireless communication characteristics is obtained on the basis of an average throughput and an instantaneous throughput of communication between said plurality of user equipment and a propagation path gain to an adjacent cell or sector in said wireless communication system.

11. The radio resource allocation control apparatus according to claim 10, wherein said control unit controls a first coefficient concerning said average throughput and a second coefficient concerning said propagation path gain independently for said radio resources.

12. A base station comprising the radio resource allocation control apparatus according to claim 1.

13. A radio resource allocation control method for controlling allocation of radio resources used in communication by a plurality of user equipment in a wireless communication system, said method comprising:
  selecting, by a scheduler in a base station, a user equipment to which said allocation is performed by using a priority evaluation formula in which a plurality of user equipment having wireless communication characteristics that have a higher tendency of being selected as a target of said allocation vary when different coefficients are imparted; and
  controlling said coefficients individually for said radio resources,
  wherein said controlling includes controlling said coefficients to the same radio resource to be mutually different values in adjacent cells or sectors in said wireless communication system.

14. The method of claim 13 wherein the controlling is performed by a controller.

15. A radio resource allocation control apparatus for controlling allocation of radio resources used in communication by a plurality of user equipment in a wireless communication system, said apparatus comprising:
  a selecting unit for selecting a user equipment to which said allocation is performed by using a priority evaluation formula in which a plurality of user equipment having wireless communication characteristics that have a higher tendency of being selected as a target of said allocation vary when different coefficients are imparted; and
  a control unit for controlling said coefficients individually for said radio resources,
  wherein said control unit controls said coefficients individually for layers serving as said radio resources and indicating a sequence of demodulating and decoding signals received from said plurality of user equipment.

16. The radio resource allocation control apparatus according to claim 15, wherein said selecting unit selects said user equipment serving as an allocation target, on the basis of a priority obtained according to the following priority evaluation formula (6):

$$\rho_{j,k,l} = \frac{r_{j,k,l}}{R_{k,l}^{\alpha_j}} \qquad (6)$$

where k is an index of said user equipment, l is an index of timing, j is an index of said layer, $r_{j,k,l}$ denotes an instantaneous throughput of a user equipment #k at a timing #l in a layer #j, $R_{k,l}$ denotes an average throughput of a user equipment #k up to a timing #l, and $\alpha_j$ denotes said coefficient for a layer #j.

17. A radio resource allocation control apparatus for controlling allocation of radio resources used in communication by a plurality of user equipment in a wireless communication system, said apparatus comprising:
  a selecting unit for selecting a user equipment to which said allocation is performed by using a priority evaluation formula in which a plurality of user equipment having wireless communication characteristics that have a higher tendency of being selected as a target of said allocation vary when different coefficients are imparted; and
  a control unit for controlling said coefficients individually for said radio resources,
  wherein said control unit controls said coefficients individually for a plurality of frequency bands available as said radio resources in said wireless communication system and for layers serving as said radio resources and indicating a sequence of demodulating and decoding signals received from said plurality of user equipment.

18. The radio resource allocation control apparatus according to claim 17, wherein said selecting unit selects said user equipment serving as an allocation target, on the basis of a priority obtained according to the following priority evaluation formula (7):

$$\rho_{i,j,k,l} = \frac{r_{i,j,k,l}}{R_{k,l}^{\alpha_{i,j}}} \qquad (7)$$

where k is an index of said user equipment, l is an index of timing, i is an index of said frequency band, j is an index of said layer, $r_{i,j,k,l}$ denotes an instantaneous throughput of a user equipment #k at a timing #l in a frequency band #i in the layer #j, $R_{k,l}$ denotes an average throughput of a user equipment #k up to a timing #l, and $\alpha_{i,j}$ denotes said coefficient for said frequency band #i and said layer #j.

* * * * *